US010859493B2

(12) United States Patent
Cappo et al.

(10) Patent No.: US 10,859,493 B2
(45) Date of Patent: Dec. 8, 2020

(54) MINIATURE, FIELD PORTABLE, SURFACE PLASMON RESONANCE APPARATUS AND ITS APPLICATIONS IN THE DETECTION OF CHEMICAL AND BIOLOGICAL AGENTS

(71) Applicant: LacriSciences, LLC, Washington, DC (US)

(72) Inventors: Anthony P. Cappo, Brooklyn, NY (US); Diptabhas Sarkar, Katy, TX (US); Paul T. Gavaris, Washington, DC (US); Chris D. Geddes, Bel Air, MD (US); Ali H. Ghovanlou, Potomac, MD (US)

(73) Assignee: LACRISCIENCES, LLC, Washington, DC (US)

( * ) Notice: Subject to any disclaimer, the term of this patent is extended or adjusted under 35 U.S.C. 154(b) by 0 days.

(21) Appl. No.: 15/735,596

(22) PCT Filed: Jun. 10, 2016

(86) PCT No.: PCT/US2016/036834
§ 371 (c)(1),
(2) Date: Dec. 11, 2017

(87) PCT Pub. No.: WO2016/201189
PCT Pub. Date: Dec. 15, 2016

(65) Prior Publication Data
US 2018/0313754 A1 Nov. 1, 2018

Related U.S. Application Data

(60) Provisional application No. 62/175,034, filed on Jun. 12, 2015.

(51) Int. Cl.
*G01N 21/552* (2014.01)

(52) U.S. Cl.
CPC .................. *G01N 21/553* (2013.01)

(58) Field of Classification Search
CPC ............... G01N 21/553; G01N 21/554; G01N 33/0009; G01N 2201/0221
See application file for complete search history.

(56) References Cited

U.S. PATENT DOCUMENTS 5,923,031 A 7/1999 Naya
6,139,797 A * 10/2000 Suzuki ................. G01N 21/553
356/445

(Continued)

FOREIGN PATENT DOCUMENTS

CN 102253014 A 11/2011
CN 102692397 B 6/2012
(Continued)

OTHER PUBLICATIONS

*Lacrisciences, Inc.* v *Cappo and Opticology*, Matter No. 2017-0842, Delaware Chancery Court, Response and Oounterclaim, submitted Jan. 16, 2018.

(Continued)

*Primary Examiner* — Michael P LaPage
(74) *Attorney, Agent, or Firm* — Benjamin C. Pelletier; Venable LLP

(57) ABSTRACT

An SPR detection apparatus has an optical system with a sensor member including a planar metallic layer, the sensor member being removably mountable to a housing. First optics direct an incident beam toward a rear side of the metallic layer at a predetermined range of angles to a normal to the sensor layer. Second optics guide at least one reflected beam, corresponding to the incident beam, from the metallic layer to the transducer. The transducer converts incoming electromagnetic radiation to an electrical signal for transmission to a signal processor disposed in the housing and operatively connected to the at least one opto-electrical (Continued)

transducer so as to detect a surface plasmon resonance angle. The first optics are configured so that the at least one incident beam spans at least about 20°.

17 Claims, 14 Drawing Sheets

(56) References Cited

U.S. PATENT DOCUMENTS

| | | | |
|---|---|---|---|
| 6,326,612 B1* | 12/2001 | Elkind | G01N 21/05 |
| | | | 250/239 |
| 6,415,235 B1* | 7/2002 | Bartholomew | G01N 21/553 |
| | | | 356/445 |
| 7,148,968 B2* | 12/2006 | Codner | G01N 21/553 |
| | | | 356/445 |
| 7,395,103 B2 | 7/2008 | Cappo | |
| 7,675,624 B2* | 3/2010 | Chinowsky | G01N 21/553 |
| | | | 356/445 |
| 8,249,682 B2 | 8/2012 | Cappo | |
| 2001/0040130 A1 | 11/2001 | Lorch et al. | |
| 2003/0059342 A1* | 3/2003 | Elkind | G01N 21/05 |
| | | | 422/82.01 |
| 2003/0103208 A1* | 6/2003 | Quinn | G01N 21/553 |
| | | | 356/445 |
| 2004/0017572 A1 | 1/2004 | Anafi et al. | |
| 2004/0086872 A1* | 5/2004 | Childers | B01L 3/502707 |
| | | | 435/6.19 |
| 2004/0100634 A1* | 5/2004 | Bartholomew | G01N 21/553 |
| | | | 356/445 |
| 2004/0135272 A1 | 7/2004 | Lu | |
| 2004/0263854 A1 | 12/2004 | Anafi | |
| 2005/0046854 A1 | 3/2005 | Kunuki et al. | |
| 2005/0159657 A1 | 7/2005 | Cappo et al. | |
| 2005/0200852 A1* | 9/2005 | Kimura | G01N 21/553 |
| | | | 356/445 |
| 2005/0200853 A1 | 9/2005 | Mori et al. | |
| 2006/0012795 A1 | 1/2006 | Niemax et al. | |
| 2006/0127278 A1* | 6/2006 | Gast | B82Y 15/00 |
| | | | 422/82.05 |
| 2006/0188401 A1 | 8/2006 | Robotti | |
| 2007/0109541 A1* | 5/2007 | Imato | G01N 21/553 |
| | | | 356/445 |
| 2008/0030737 A1 | 2/2008 | Su et al. | |
| 2009/0005660 A1 | 1/2009 | Cappo et al. | |
| 2009/0323073 A1 | 12/2009 | Luber et al. | |
| 2010/0128269 A1 | 5/2010 | Chinowsky | |
| 2010/0285612 A1* | 11/2010 | Iwasaki | G01F 1/704 |
| | | | 436/518 |
| 2013/0344623 A1 | 12/2013 | Ran | |
| 2014/0185051 A1 | 7/2014 | Guan et al. | |
| 2015/0109614 A1 | 4/2015 | De Oliveira Da Fonseca | |
| 2015/0300954 A1* | 10/2015 | Chan | G01N 21/553 |
| | | | 422/82.05 |
| 2016/0313246 A1* | 10/2016 | Wong | G01N 21/553 |
| 2018/0321150 A1* | 11/2018 | Gavaris | A61B 5/1455 |

FOREIGN PATENT DOCUMENTS

| | | |
|---|---|---|
| JP | H11183372 A | 7/1999 |
| JP | 2002214134 A | 12/2002 |
| JP | 2004053372 A | 2/2004 |
| JP | 2007527278 A | 9/2007 |
| JP | 2007333612 A | 12/2007 |
| JP | 2012523576 A | 10/2012 |
| WO | 0188525 A1 | 11/2011 |

OTHER PUBLICATIONS

*Lacrisciences, Inc.* v *Cappo and Opticology*, Matter No. 2017-0842, Delaware Chancery Court, Complaint, submitted Nov. 22, 2017.
PCT/US2016/036834, International Preliminary Report on Patentability, dated Dec. 12, 2007.
PCT/US2016/036834, International Search report and Written Opinion, dated Sep. 28, 2016.
Robelek, et al., "Label-free and time-resolved measurements of cell volume changes by surface plasmon resonance (SPR) spectroscopy," (2010) Biosensors and Bioelectronics 25(5):1221-1224.
Kim et al., "Novel Miniature SPR Immunosensor Equipped with All-in-one Multi-microchannel Sensor Chip for Detecting Low-molecular-weight Analytes," (2007) Biosensors and Bioelectronics 23(5):701-707.
JP Office Action dated Mar. 10, 2020 in JP Application No. 2018-516390, filed Jun. 10, 2016.

* cited by examiner

IMAGE OBTAINED ON DETECTOR

IMAGE OBTAINED ON DETECTOR

IMAGE OBTAINED ON DETECTOR

MULTI ELEMENT LENSES, BEAM COMBINER AND ONE DETECTOR 350

IMAGE OBTAINED ON DETECTOR

MINIATURE, FIELD PORTABLE, SURFACE PLASMON RESONANCE APPARATUS AND ITS APPLICATIONS IN THE DETECTION OF CHEMICAL AND BIOLOGICAL AGENTS

TECHNICAL FIELD

Provided are systems, methods and devices/apparatuses utilizing surface plasmon resonance for measurement of very small concentrations of solute. In particular, provided is a system and particularly apparatuses that takes the form of a portable analytical instrument capable of conveniently making precise measurements outside a laboratory environment and in particular hostile environments.

BACKGROUND ART

Surface Plasmon Resonance (SPR) systems are well known and generally used in a laboratory setting as bench top analytical systems. The phenomenon of surface plasmon oscillations generated in a thin film layer of metal occurs when incident light strikes the surface at a particular angle. A simple detection system can detect changes in the oscillation or resonant frequency of the surface plasmons, which changes as a function of the environment surrounding the metallic surface. This leads to detection of minute changes in for instance, concentration of a solution in contact with the metal surface. The core of the instrument is optical in nature employing light source, optics, (lenses, prisms), and optical detector.

Common SPR systems employ the Kretschmann configuration, where light is injected into a glass substrate, typically in the shape of a hemicylindrical prism (a cylinder cut in half along its axis with a polished curved surface and a polished planar or flat surface) such that the incident beam strikes the planar surface of the prism at an angle greater than the critical angle of the interface causing total internal reflection (TIR). A thin-film of metal, typically gold of 50 nm thickness, is deposited on the planar surface of the hemicylindrical prism. At a particular angle of incidence (greater than the critical angle), the evanescent wave arising from TIR penetrates through the gold layer and couples with the surface plasmon modes in the metal setting them into oscillation. Surface Plasmons (SP) are the longitudinal oscillations of free electrons on the metal surface. Probing the frequency of these surface plasmon modes by detecting the angle of incidence at which they are launched is the basis of surface plasmon resonance (SPR) spectroscopy. It is important to note that the beam of light strikes the metal film at the interface with the glass medium; this is referred to as the underside. SPs are however launched at the other side of the metal layer or film, which then is the topside. SPs are also evanescent in nature, which means any change within a short distance of the topside, typically of the order of the wavelength of the incident beam, affects the plasmon frequency. For SPR to be used as a biological or chemical sensor, ligands are adhered to the topside. When the analytes bind to these ligands, changes are affected in this metal (e.g., gold) layer immediately close to the topside leading to changes in SPR frequency. By interrogating these changes from the underside of the gold layer, one can sense the specific target molecules. The topside of the metal layer is thus also the sensing surface.

SPR systems are routinely used in biology, chemistry, and material science for instance. The devices are inherently sensitive, and become very powerful when coupled with ligand/analyte chemistry. In this case, a ligand is developed that specifically binds with the analyte of interest. The ligand is then chemically attached to the metallic surface, and it is the interaction of the analyte and the ligand causes a change in resonant frequency of the surface plasmons. This makes the system specific, i.e. the ligand only reacts with the analyte and other constituents do not contribute to signal change. A chemistry laboratory for instance would employ an SPR system as part of a suite of other instruments each tending to complimenting one another for a particular type of measurement while at times providing overlapping data. Examples of other types of instruments and techniques used in tandem to SPR would include, for example, Fluorescence Spectroscopy, High-performance liquid chromatography (HPLC), Infrared (IR) Spectroscopy, X-ray photoelectron spectroscopy (XPS). Though these systems can sometimes make measurements that SPR cannot, SPR is unique in its inherent sensitivity and with appropriate ligand development, specificity. Developing ligands that specifically bind to the analyte of interest makes SPR a powerful platform for specific detection of very small concentrations.

Attempts have been made to develop smaller devices (see, e.g., U.S. Pat. No. 7,148,968, US20100284012, CN102692397B. However, truly portable field systems are still needed where neither the device nor testing procedure requires specialized facilities or trained personnel and where such devices are self-calibrating.

SUMMARY OF THE DISCLOSURE

Provided is an SPR system and apparatus/device that is self-contained with its own power source, is self-calibrating, has an internal processor, and may be wirelessly linked to a smart phone or nearby computer for reporting results or additional analysis. Further provided is a method to measure chemical and biological agents, in very small concentrations, if necessary (e.g. nanomolar), with novel ligand/analyte chemistry. A portable SPR system can be used in a multitude of ways, and examples given here are by no means meant to limit its utility to these, but only to distinguish a few possible device and sensor configurations and operational modalities. In the battlefield, a soldier may need to know whether a suspicious package contains TNT (2,4,6-trinitrotoluene) before specialists arrive on the scene. With a field portable SPR system, the soldier could remove a small pouch from a backpack containing an SPR system the size of a deck of cards, tear open a packaged sensor (e.g. vacuum packed to resist contamination) prepared with a TNT ligand, insert the sensor into a slot in the miniature device, and expose the sensor surface near the proximity of the package in question. The device would respond with a 'yes' or 'no' answer to the presence of TNT, or in a more comprehensive version, the relative concentration of TNT.

In a testing laboratory, food science or manufacturing site, or any other facility that requires monitoring over long periods of time, the concentration of some constituent (e.g. fructose) would need to be reported on an hourly basis throughout a 12 hour period. In this case, the sensor would be inserted inline into the flow of material (e.g. a liquid). In fact, sensors could be placed at multiple locations at different points of manufacturing.

Provided is a miniature SPR device that may take the form of probe, where the end of the probe interfaces with the sensor. For economy one probe may receive data from multiple sensors. A worker at intervals may connect the probe to the sensor, receive data on the amount of e.g., fructose bound to the sensor surface at that instant in time, disconnect the sensor from the handheld probe leaving the sensor behind in its place inline to the flow of material, and move to the next sensor for data taking. This collection of data may be sent (with wireless connectivity) to a host record keeping computer.

In a particular embodiment, if the SPR system takes the form of a handheld probe that can be dipped into a beaker of solution, it may be used in environmental field testing for testing liquids such as groundwater. Ligands attached to the SPR sensor surface may be used to detect groundwater contamination from heavy metals, arsenic, or other pollutants in very small concentrations.

In particular, provided is an optical system for a detection apparatus which is operable in part to determine chemical species concentration and which employs surface plasmon resonance. The apparatus has a housing, which may be hand-held, the system being disposed in or on the housing. The optical system comprises a sensor member including a planar metallic layer, the sensor member being removably mountable to the housing, first optical elements disposed in the housing and configured to direct at least one incident beam toward a rear side of the metallic layer at a predetermined range of angles to a normal to the layer, at least one opto-electrical transducer disposed in the housing, and second optical elements disposed in the housing and configured to guide at least one reflected beam, corresponding to the at least one incident beam, from the metallic layer to the at least one opto-electrical transducer. In a particular embodiment, the incident beam may comprise multiple wavelengths. The at least one opto-electrical transducer converts incoming electromagnetic radiation to an electrical signal for transmission to a signal processor disposed in the housing and operatively connected to the at least one opto-electrical transducer so as to detect a surface plasmon resonance angle. The first optical elements are configured so that the at least one incident beam spans at least about 20°. In a particular embodiment, the opto-electrical transducer includes but is not limited to one or alternatively two or more opto-electrical transducer devices spaced from one another in the housing. The at least one reflected beam comprises a pair of reflected beam portions having respective reflection angle ranges spaced from one another, while the second optical elements are configured to direct a first of the reflected beam portions to one of the opto-electrical devices and a second of the reflected beam portions to another of the opto-electrical devices. A multiplexer may be disposed downstream of the opto-electrical devices. In another embodiment, the first optical elements include a prism and the metallic layer is disposed on a surface of the prism, the prism includes two first surfaces oriented at a first angle with respect to one another, and the first surfaces are each oriented at respective second angles relative to the metallic layer. Where the two first surfaces are located on an input or upstream side of the metallic layer, the prism further includes two second surfaces located on an output or downstream side of the metallic layer and oriented at the first angle with respect to one another, the second surfaces each being oriented at respective ones of the second angles relative to the metallic layer. The first optical elements may include, but are not limited to, two or more laser beam sources, each configured to direct a respective incident beam to the sensor surface via a respective one of the first surfaces, the at least one opto-electrical transducer including at least one opto-electrical transducer device. In a further embodiment, the second optical elements include, but are not limited to, a beam combiner, with the opto-electrical transducer constituting at least one electro-optical transducer device (e.g., a single planar array of contiguous opto-electric transducer elements). In yet another embodiment, the first optical elements include a plurality of microlenses disposed in respective optical beam paths and generating respective beams converging to respective focal lines on the metallic layer. The second optical elements concomitantly include a like plurality of microlenses disposed in respective optical beam paths so as to collimate respective beams diverging from the respective focal lines.

In a further embodiment, as set forth in further detail below, the first optical element comprises a scanner which may employ, for example, a digital micromirror device. The system may further comprise one or more non-SPR detection systems. Said non-SPR detection system may employ, for example, fluorescence spectroscopy, infrared spectroscopy, ultraviolet-visible spectroscopy, impedance spectroscopy, reflectance spectroscopy or cyclic voltammetry.

The system may further comprise a cap for a surface plasmon resonance detection device having a sensor part provided with a metallic sensor surface, where the cap includes a body member adapted to insert over the sensor part in liquid-tight contact therewith. The body member includes at least one capillary circuit including a microfluidic inlet bore, a microfluidic chamber communicating with the inlet bore and disposable in juxtaposition to the metallic surface, and a microfluidic drain or vent channel communicating with the chamber. Also provided is a method for modulating the length of a microfluidic bore of the cap where the microfluidic bore is a capillary bore, wherein said method comprises altering surface properties of said capillary bore. In a particular embodiment, the surface properties of said capillary bore are modified by coating the inner wall of said capillary bore with one or more surface active agents or application of external stimulation including but not limited to electrical voltage, electromagnetic radiation and acoustic waves.

The cap's body member may be adapted for coupling to the sensor part so that the inlet bore and the drain or vent channel communicate with the ambient environment. Where the capillary circuit is a first capillary circuit, the cap's body member may be formed with a second capillary circuit including an inlet channel, an additional microfluidic chamber communicating with the inlet channel and disposable in juxtaposition to the metallic surface, and an additional drain or vent channel communicating with the additional microfluidic chamber. The cap then further comprises a microfluidic reservoir disposed at an upstream end of the inlet channel opposite the additional microfluidic chamber, the reservoir containing a reference solution of predetermined SPR characteristics. The reservoir may be provided with an activation element, trigger, release, frangible member, etc., for enabling transfer of the reference solution from the reservoir to the inlet channel and the additional microfluidic chamber.

Also provided is said cap set forth above. Said cap may also further provide one or more non-SPR detection systems, as noted above, which may include, but is not limited to, a system for fluorescence spectroscopy, infrared spectroscopy, ultraviolet-visible spectroscopy, reflectance and/or system for detecting electrochemical properties, which may employ cyclic voltammetry and/or impedance spectroscopy.

Also provided is a method for detecting the presence and/or amount of a target biological or chemical constituent in a test fluid comprising applying a reference fluid and said test fluid to the system set forth above under conditions sufficient to detect the presence and/or amount of said target biological or chemical constituent.

In particular, provided is a detection method which comprises (a) providing a surface plasmon resonance device having a housing, (b) attaching a replaceable modular sensor part to the housing, wherein the sensor part includes a first planar metallic layer, (c) disposing a reference fluid in contact with said first metallic layer, (d) thereafter operating the device to determine a first surface plasmon reference angle for the reference fluid, (e) disposing a test fluid in contact with said first metallic layer, (f) thereafter operating the device to determine a second surface plasmon reference angle for the test fluid, (g) operating a signal processor to determine, from the first surface plasmon resonance angle and the second surface plasmon resonance angle, presence of a target biological or chemical constituent in the test fluid, (h) removing the sensor part from the housing, and (i) attaching a different modular sensor part to the housing, wherein the different modular sensor part includes a second planar metallic layer. The reference fluid may be air. The operating of the signal processor may include operating the signal processor so as to determine a concentration of the target biological or chemical constituent.

Where the reference fluid is a liquid, the method further comprises attaching a replacement modular cap to the housing over the replaceable modular sensor part so that the cap is in fluid-tight contact with the replaceable modular sensor part. The reference fluid is flowed or conducted from a reservoir in the cap to the first metallic layer prior to the operating of the device to determine the first surface plasmon reference angle. The disposing of the test fluid in contact with the first metallic layer includes drawing the test fluid through a capillary or microfluidic channel in the cap to the first metallic layer.

The method further comprises providing a non-plasmon resonance means or more particularly device and determining the presence and optionally concentration of a target biological or chemical constituent in said test fluid and comparing the results obtained using SPR with said non-SPR means. More specifically, provided is a method for operating a device, in particular, an SPR detection device, a device for measuring SPR signals for detecting presence of a fluid constituent. The device comprises a housing and first optical elements disposed in the housing including a source of electromagnetic radiation, and further comprises second optical elements disposed in the housing and including at least one opto-electrical transducer. The device also includes a signal processor disposed in the housing and operatively connected to the at least one opto-electrical transducer. The method comprises (i) attaching a sensor part to the housing, wherein the sensor part includes a planar metallic layer, (ii) disposing a reference fluid in contact with the metallic layer, (iii) thereafter operating the first optical elements to direct at least one incident beam toward a rear side of the metallic layer at a predetermined range of angles to a normal to the layer, (iv) operating the second optical elements including the at least one opto-electrical transducer to detect reflection intensity as a function of reflection angle for the reference fluid, (v) generating a first electrical signal encoding the reflection intensity for the reference fluid, (vi) operating the signal processor to detect from the first electrical signal a first surface plasmon resonance angle for the reference fluid, (vii) storing the first resonance angle, (viii) disposing a test fluid in contact with the metallic layer, (ix) thereafter operating the first optical elements to direct at least one incident beam toward a rear side of the metallic layer at the predetermined range of angles to the normal to the layer, (x) operating the second optical elements including the at least one opto-electrical transducer to detect reflection intensity as a function of reflection angle for the test fluid, (xi) generating a second electrical signal encoding the reflection intensity for the test fluid, (xii) operating the signal processor to detect from the second electrical signal a second surface plasmon resonance angle for the test fluid, and (xiii) further operating the signal processor to determine, from the first surface plasmon resonance angle and the second surface plasmon resonance angle, presence of a target biological or chemical constituent in the test fluid. The at least one incident beam spans at least about 20°. The device may in addition to being an SPR device may also be a device for making non-SPR measurements or alternatively, generating non-SPR data (e.g., fluorescence, IR, UV/visible, electrochemical properties). In a related aspect, the method may further comprise directing at least one incident beam to the front side of said metallic layer to generate a non-SPR signal or energy stimulating source. In a particular embodiment, the energy-stimulating source may be an electrical signal, microwaves, and ultrasound.

DETAILED DESCRIPTION OF SPECIFIC EMBODIMENTS

Figure 1:
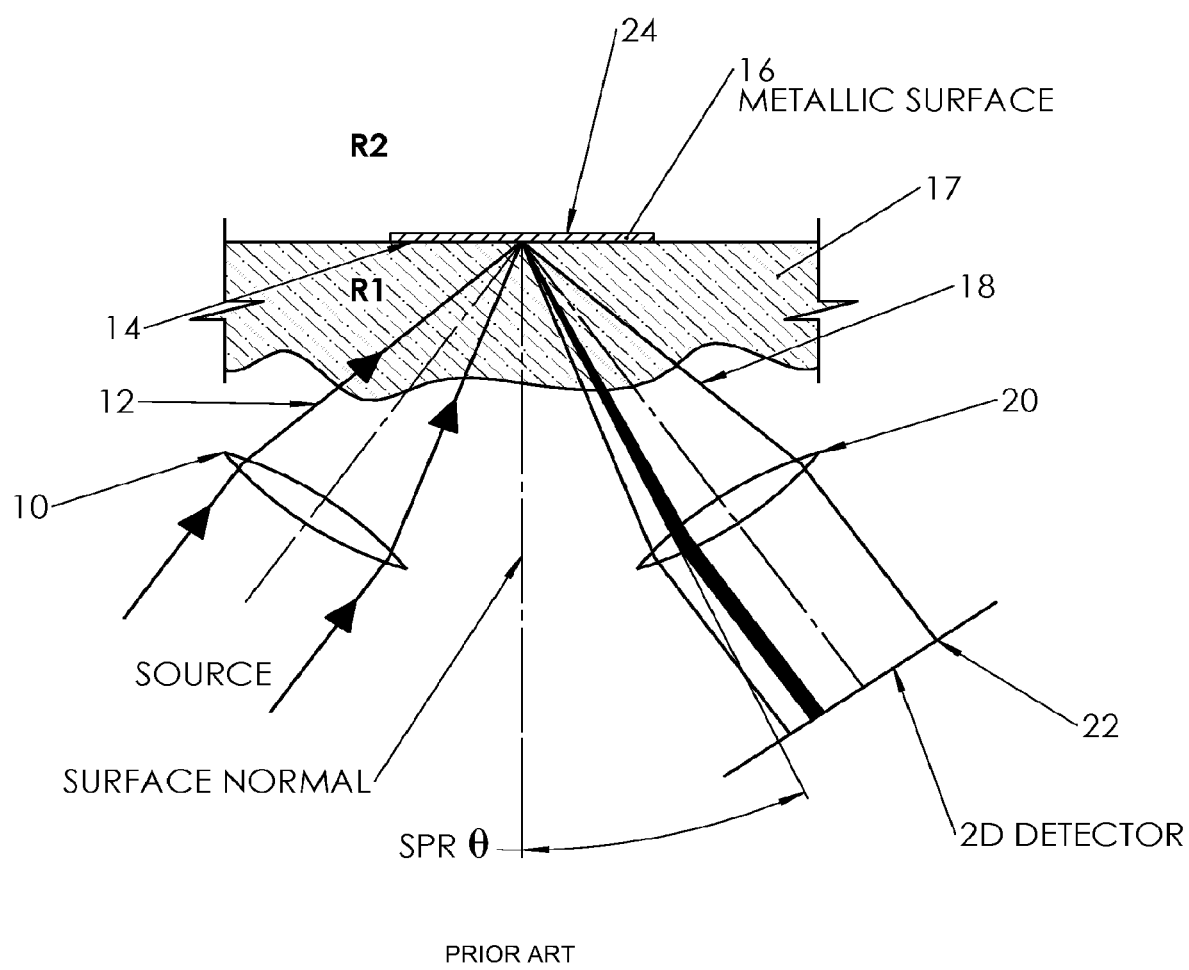
FIG. 1 is a schematic diagram of a generic or known optical system for surface plasmon resonance (SPR) detection.

The system will now be described in more detail by way of example with reference to the embodiments shown in accompanying figures. It should be kept in mind that the following described embodiments are only presented by way of example and should not be construed as limiting the inventive concept to any particular physical configuration.

Where a range of values are provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this disclosure are incorporated by reference in their entirety. Nothing herein is to be construed as an admission that the invention is not entitled to antedate such disclosure by virtue of prior invention. To the extent the material incorporated by reference contradicts or is inconsistent with this specification, the specification will supersede any such material.

It must be noted that as used herein and in the appended claims, the singular forms "a," "and" and "the" include plural references unless the context clearly dictates otherwise.

Unless otherwise indicated, the term "at least" preceding a series of elements is to be understood to refer to every element in the series. Those skilled in the art will recognize, or be able to ascertain using no more than routine experimentation, many equivalents to the specific embodiments of the invention described herein. Such equivalents are intended to be encompassed by the present invention. Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step. Thus the terms "comprising", "including," containing", "having" etc. shall be read expansively or open-ended and without limitation. The terms "thin-layer film of metal", "metallic thin-film", "metal layer", "metallic layer" are used interchangeably.

Figure 4A:
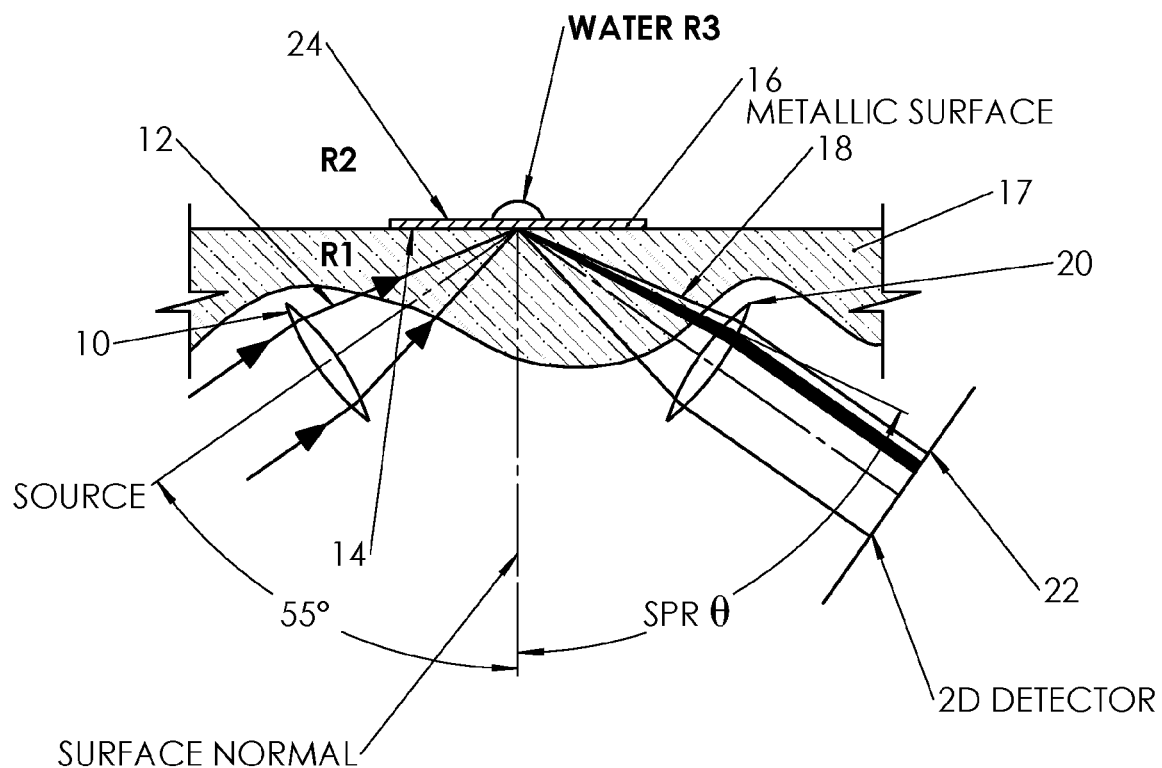
FIG. 4A is a diagram of an optical system measuring an SPR response of a drop of aqueous solution.
Figure 5A:
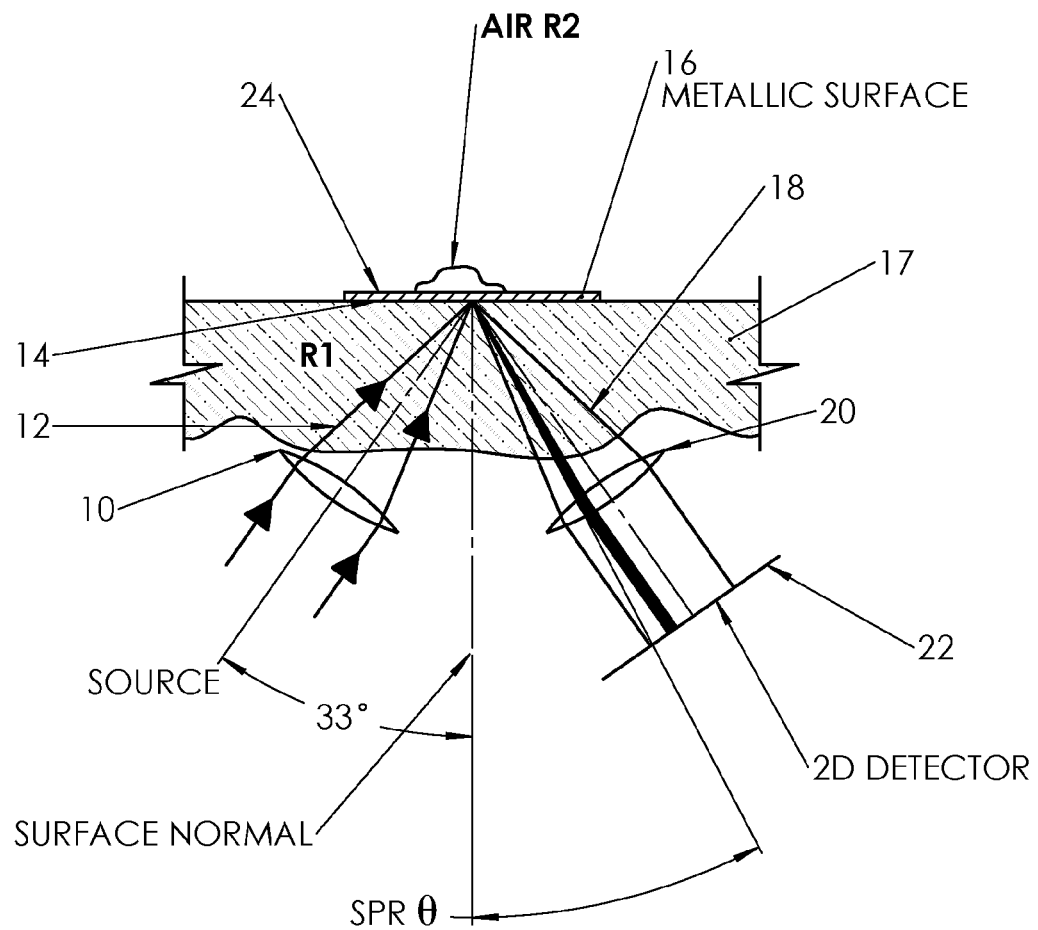
FIG. 5A is a diagram of an optical system measuring an SPR response of air.

FIGS. 1, 4A and 5A depicts an SPR system comprising input optics 10 that generate a convergent incident beam 12 and direct the beam to a rear surface 14 or the underside of a thin-film of metal 16 deposited on an optical substrate 17 (e.g. glass) with index of refraction R1 for qualitative detection of the presence and optionally a quantitative detection of concentration of an analyte (ion, molecule, viral particle, etc.) of interest. The medium in contact with and defined as the top side of the thin-film of metal has refractive index R2. A divergent reflected beam 18 is captured and focused by output optics 20 onto an opto-electrical transducer 22, typically a charge coupled device having a planar or 2D array of pixelated optical elements. As noted above and as will be set forth in further detail below, FIG. 1 depicts a generic SPR system, FIG. 4A is a diagram of an optical system measuring an SPR response of a drop of aqueous solution and FIG. 5A is a diagram of an optical system measuring an SPR response of air.

Field Portability

U.S. Pat. No. 7,395,103 by Cappo et al describes a portable handheld SPR device used as a probe for measuring constituents in the tear film. Others describe miniature SPR systems that would lend themselves to portability simply based on their size even if they weren't intentionally meant to do so.

Provided herein is a miniature handheld SPR system that incorporates and exceeds the features of a laboratory instrument. An improved version of a laboratory version is needed as use of a sensitive analytical instrument such as SPR in the field requires special attention to ensure accurate measurement in less than ideal conditions.

Figure 2A:
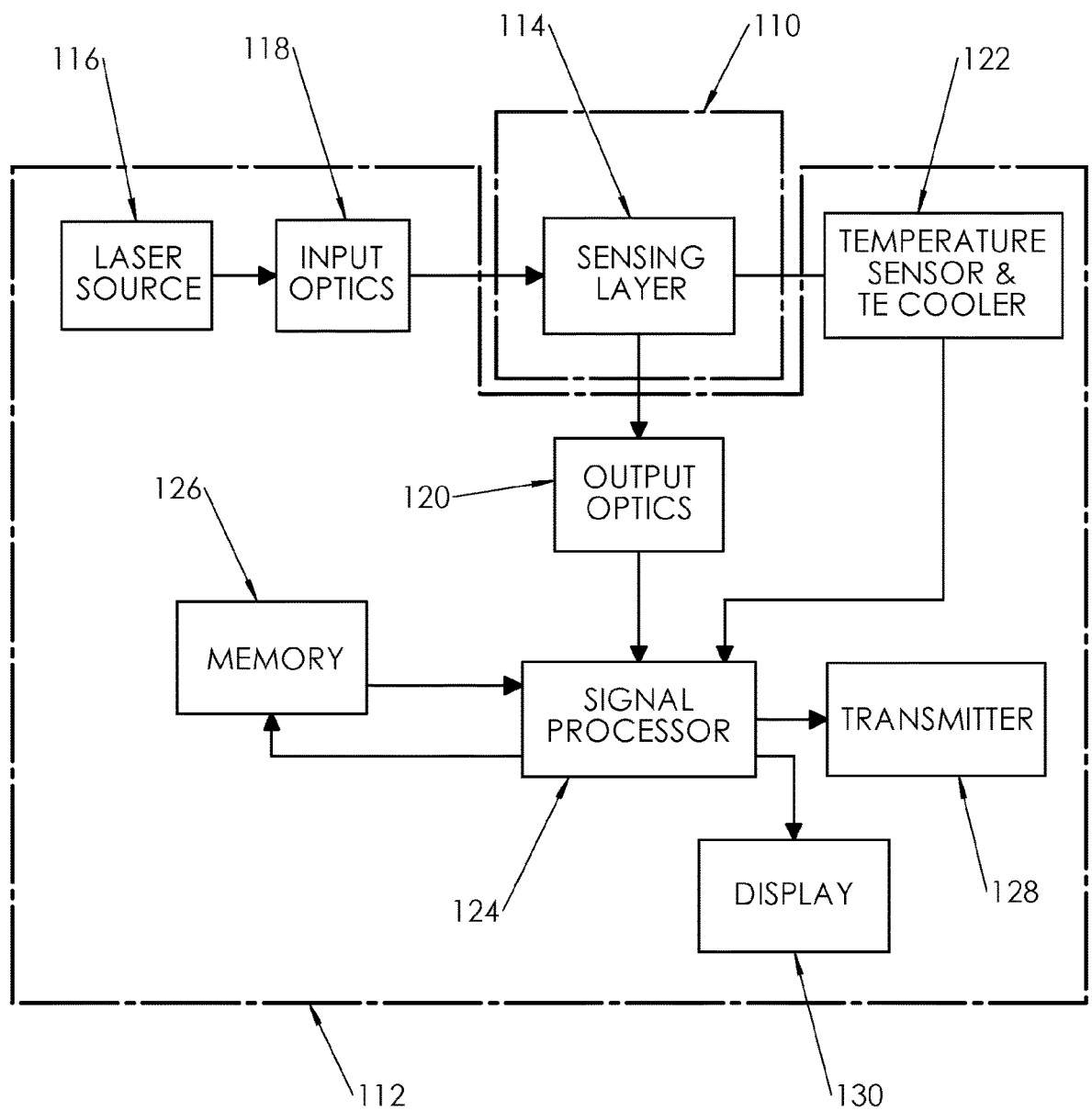
FIG. 2A is a block diagram of the disclosed SPR device in accordance with the present invention.
Figure 2B:
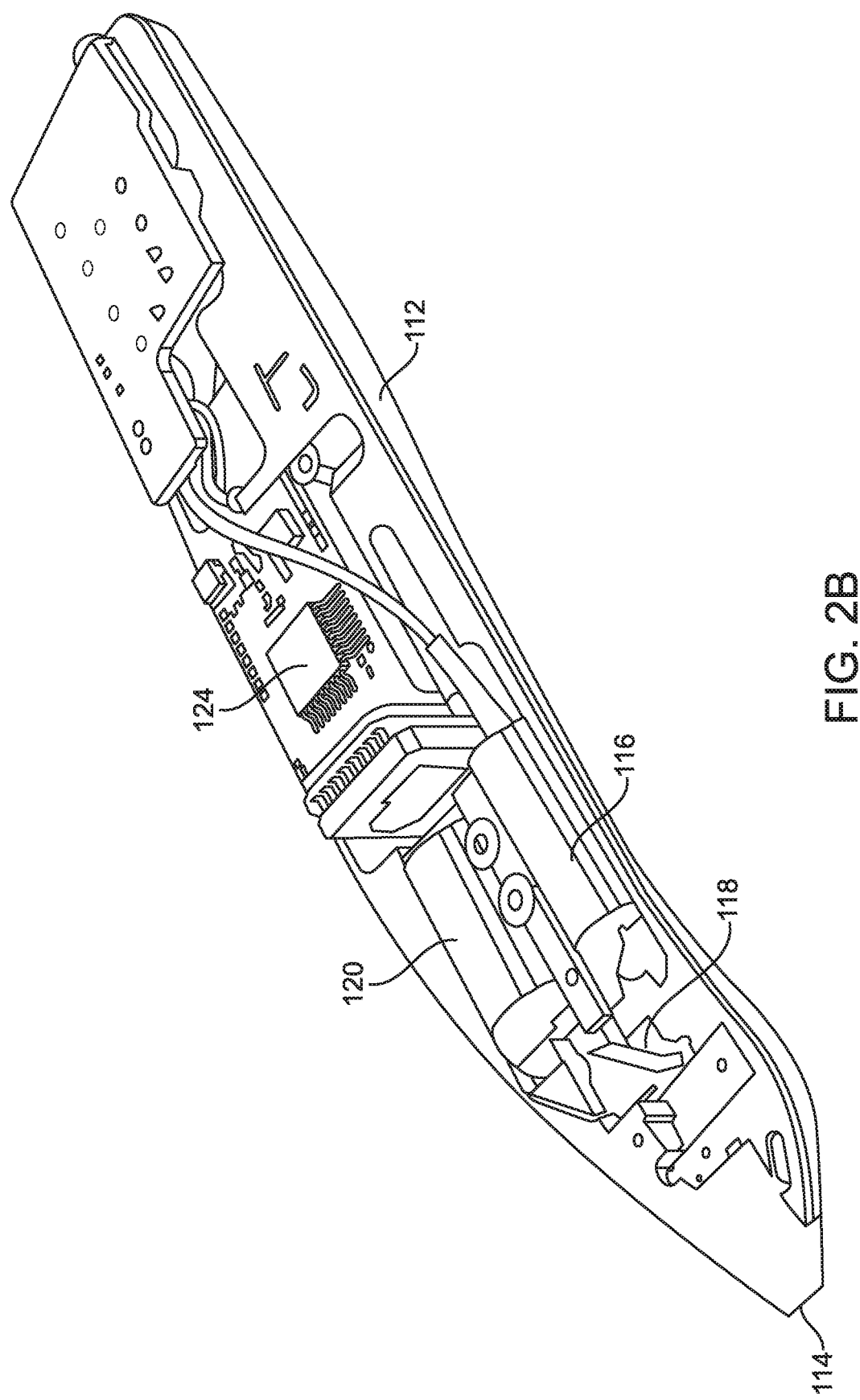
FIG. 2B is a three dimensional depiction of said SPR device.

A block diagram of the present miniature system is shown in FIG. 2A and a three-dimensional depiction is shown in FIG. 2B. A 'front end' or sensor part 110 is attached to a housing 112 of the unit and comes into contact with a test solution or fluid and provides a means to deliver the solution to a sensor surface 114. Sensor part 110 contains the sensor surface 114, typically 50 nm layer of gold vacuum deposited on glass over a thin layer (~2 nm) of Chrome or other underlayment material so the gold adheres well. The 'glass' can be any other material transparent at the operating wavelength (e.g. plastic) with reflecting facets (including those operating under total internal reflection) such that the angle of incidence of the incoming light is within the range of the SPR phenomenon to occur for the given conditions (index of refraction, sensor material, wavelength, etc.). A laser source 116 (e.g. visible laser diode at 633 nm of the type 3.8 mm or 5.6 mm TO package) in the housing 112 produces an interrogation laser beam. An upstream or input optical system 118 conditions the laser beam in spatial profile and delivers the beam to sensing surface or layer 114 to interrogate bound or adsorbed molecules, and a downstream or output optical system 120 with imaging optics directs a reflected beam to an opto-electronic sensor (not separately shown in FIG. 1) or focal plane array such as a charge-coupled device which is a monochrome (since only one wavelength), high resolution ("HD"), with small pixel size (~1 micron). An image sensor with these attributes allows the device to have very high affinity in detecting small changes in concentration since SPR line movement can be detected to a very small degree. Additionally, mounted in the front end is a temperature sensor 122, that gathers temperature data at one or more locations in and around the sensor surface 114 and provides feedback loop for thermoelectric cooler to maintain constant temperature. A signal processing unit 124 is implemented by a microprocessor, computer, or other electronics, and receive a video image signal from the focal plane array of the output optics 120. Software configures the signal processing unit 124 to process the raw video image data to determine with precision the SPR angle minimum. Temperature data from sensor 122 is fed into SPR minimum calculations in real time to correct for temperature variations throughout the measurement process. Additionally, a reference signal, determined from a reference fluid (e.g., air) is stored in a memory 126 and provided simultaneously to the signal processor 124 to yield a single value result (i.e. concentration) by reporting the difference between the SPR signal from the sample or target test fluid and that of the reference fluid. Signal processing unit 124 may be wirelessly linked via a transmitter 128 to a smart phone or nearby computer (not shown) for reporting results, record keeping, and/or additional analysis. Alternatively or additionally, the device may be provided with a display 130 connected to the signal processor 124 for providing a report of test results to a user.

In practice, for a handheld unit to contain all of the above attributes, most components are miniature in size all of which are within the current state of the art in the respective fields. FIG. 2B shows a three dimensional model of the components packaged in a handheld device and depicted in the block diagram, FIG. 2A.

Self-Referencing

The measurement technique used in SPR is primarily done relative to a reference or buffer solution. In other words, when performing a measurement in a laboratory on a bench top SPR device, fluids are pumped through tubing and come in direct contact with the sensing surface through a small flow channel. This channel would be part of an assembly that straddles the sensor surface (defined as the top side of the metallic thin-film where ligands are attached) with appropriate seals to prevent leaking and is referred to as a flow cell. A typical measurement then would involve passing a buffered solution over sensor surface followed by the fluid to be measured. The data recordation would be done as a function of time, and first a signal would be obtained for the buffer and later a change in signal for the fluid under test. If subsequent measurements injected to the sensor surface were made on fluid with similar composition but higher in concentration, each would show a change in signal proportional to the concentration. The change in signal of the processed data is representative of a change in SPR angle. If the concentration of each solution measured were known, the SPR response as a function of concentration could be documented and when an unknown concentration was measured under the same conditions its concentration could be determined.

A conventional laboratory SPR system does not do well in the field as it is bulky, requires AC power, is attached to a desktop computer, and has the additional attachment of a flow cell system. In a field portable system as compared with a laboratory set up, a flow cell system is not convenient as it adds extra components (pump, tubing) and it is preferable to simply probe a liquid with the sensor at the tip of the probe. But since SPR is a relative measurement, there needs to be some baseline to determine concentration. As an example, suppose one desires to determine with precision the concentration of salt in water. In a benchtop system with a flow cell, precision salt solutions would be made and flowed across the sensor surface producing a linear series of data points of SPR angle change versus salt concentration. When an unknown quantity is passed over the sensing surface one could infer from the empirical data the concentration of the unknown by estimating where amongst the group of known data the unknown data point falls. For instance, concentrations ranging from 500 mM to 600 mM in steps of 10 mM of salt water will produce a set of data points with increasing the SPR angle over this range. If an unknown solution of 552 mM of salt water is injected, this data point lies between 550 mM and 560 mM of calibration solutions. With some data processing, the value of the unknown solution can be predicted.

In a field situation, dipping a probe into a buffer or calibration solution is possible but very inconvenient. It requires a two-step measurement procedure and an external solution must be carried and kept free of contaminants. Before one performs the measurements, the sensor is manipulated to make contact with the solution, a reading captured and saved in the device, and then the actual measurement is done by contacting the sensor to the unknown solution.

Figure 3:
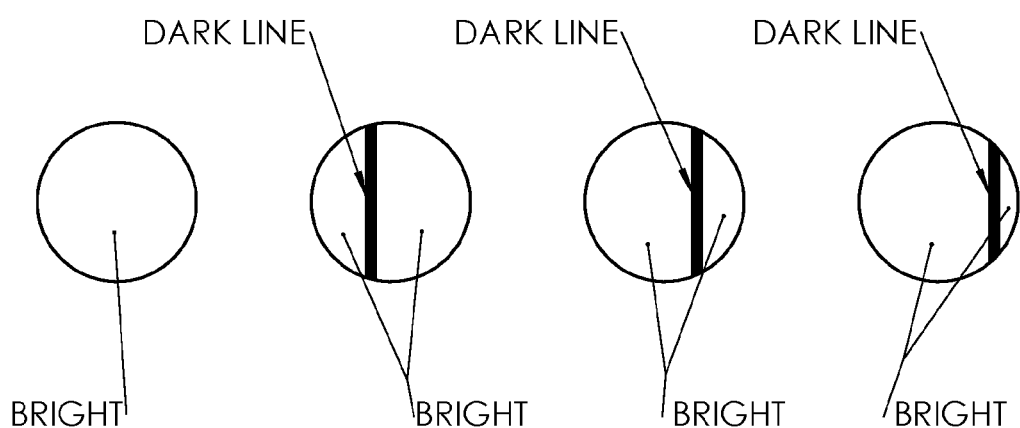
FIG. 3 is a diagram showing how different SPR absorption lines occupy different positions in an image on an optical detector.
Figure 4B:
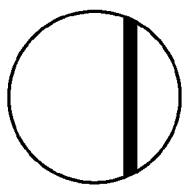
FIG. 4B shows a relative location of an SPR absorption line in an image produced by the system of FIG. 4A.
Figure 5B:
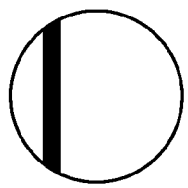
FIG. 5B shows a relative location of an SPR absorption line in an image produced by the system of FIG. 5A.

A self-referencing or self-calibrating system is particularly advantageous in a field portable system. This can be done in several ways as reference signals can be generated by water (FIGS. 4A, 4B), some other solution, or even from the air surrounding the sensor surface (FIGS. 5A, 5B). As an example of how SPR signals change as a function of the medium in contact with the sensing surface, if water with refractive index R3 is put in contact with the sensor surface the incidence angle at which the SPR phenomenon occurs is 55 degrees to the sensor surface normal (FIG. 4A). At this angle, the light is almost completely absorbed into the metallic (e.g. gold) thin-film and the resulting reflection shows near zero intensity. Fluids other than water with vastly different refractive indices, (R2) such as ethanol, for example (by SPR standards, the difference in index of water 1.33 and ethanol 1.36 is very large as SPR measurements are typically confined to $4^{th}$ to $6^{th}$ decimal place change) exhibit a large change in signal position as the angle incidence where the SPR phenomenon occurs may be 43 degrees. (See FIG. 3 showing different SPR signal lines.) Exceeding this change with a larger refractive index will produce a signal beyond 43 degrees, and may make the instrument go out of range with typical dynamic range of +/−10 degrees, and in general SPR optical systems are designed with expectation of liquid sensing with an overall detection range in SPR angle from 45-65 degrees centered at 55 degrees.

SPR can also occur when the surrounding medium is air whose refractive index at 1.0—R2 in FIG. 5A and in with the absence of the water drop in FIG. 4A—yields an SPR minimum at 33 degrees (FIG. 5A), which is far from most liquid SPR minimums. However, this SPR minimum signal from air can be utilized as a relative calibration point to the measurement and can be recorded immediately before measurement.

In that case, the SPR system is designed such that it simultaneously captures the SPR signal from air and from water, and a relative measurement is made with air functioning as the baseline. This produces an extremely practical and convenient system: as soon as a fresh sensor is inserted into the field portable instrument it can immediately obtain its reference signal from the surrounding air, and then proceed with measurement of an analyte of interest. The difference between these two signals is compared to a set of calibration data (consisting of differences between SPR air signals and SPR signal of increasing concentration of the analyte) and the unknown concentration is determined.

Other advantages to a self-referencing system relate to manufacturing tolerances of the sensor optic and the mechanical system used to retain the sensor optic in the instrument. Unlike in a benchtop system where with a flow cell system sensors can be used to run multiple experiments by rinsing between without ever physically intervening with the hardware, in a field portable system it is contemplated that sensors are typically changed before any measurement as with absence of a flow system there would be no means to rinse the sensor surface. That means that relative measurements are more difficult without a self-referencing system in that removal and insertion of a sensor could be construed as a change in SPR signal since the change is typically very small. In other words, one could not make reliable measurements using one sensor for a reference signal, removing it and inserting another sensor for measurement of the analyte.

To more clearly demonstrate the advantage, consider a testing of two concentrations of analyte with a field portable device, and in each of these measurements in the absence of a flow cell system and as a necessary convenience the sensor must be changed to a fresh one on the second measurements. The process would be as follows: the device is turned on, and a fresh sensor is opened from contamination free packaging and inserted into device. The device captures an air signal and analyte (1) signal. The sensor is removed and discarded and process is repeated with second fresh sensor capturing air signal and analyte (2) signal. In practice, the change in SPR angle is incredibly small when comparing two concentrations that are close together. Without the self-referencing air signal, the act of removing one sensor and inserting a new one could confound the measurement and it is likely that the two SPR signals from each measurement would likely have no correlation to their concentrations. Removal of the sensor and the insertion of a new one may result in the second surface being in exactly the same position as the first and could be displaced or tilted (the sensor itself has manufacturing tolerances that could cause the same). As a result, the beam of light striking the sensor surface will be at a different angle from the first sensor hence the reflected or SPR angle will not be representative of the concentration change relative to the first and will also contain misalignment information which is undesirable. Even though manufacturing tolerances can be kept small to better than 0.1 mm, the changes in SPR angle are fractions of a degree in the $3^{rd}$ or $4^{th}$ decimal place for typical changes in concentration of interest. Since overly tight tolerances are difficult and impractical, a self-referencing system becomes a necessity.

The challenge of a practical system that can capture both an SPR air signal and one that is within the range of water, relates to the demands put on the optical system and the detection system. The difference between the SPR signal at water and air is quite large and is directly related to the angular spread of the incoming light beam.

In the design of modern SPR systems, with reference being made to FIG. 1, a metallic thin-film layer 16 is vacuum deposited on glass 17 with an index of refraction R1 to a thickness of 50 nm and is interrogated from the back or under side 14 (a front or top side or metallic thin-film side 24 being where ligand is attached and the analyte contacts) with monochromatic (or pseudo-monochromatic) light. At a particular angle of incidence to the under side of the metallic thin-film surface the SPR phenomenon occurs and all the incident light at that angle is absorbed into the metallic thin-film e.g., gold thin-film. When measuring samples with a refractive index of R2, the angle of SPR occurrence ("SPR($\theta$)") is unknown and is the parameter of interest. Early SPR systems scanned a single laser beam at several angles to probe the sensor surface and determine the SPR($\theta$), the angle in which the reflected beam intensity diminished to near zero. Typical systems today use a convergent beam of light 12 impingent on the back side 14 of the metallic thin-film 16 which probes all angles within the convergent cone of light or Numerical Aperture (NA=sin($\theta$/2). Ideally a cone of light covering SPR($\theta$) angles expected for water, solvents, air, and gases, etc. would give ultimate flexibility. Practical limitations prevent this as a finite cone of light is required as well as considerations to the optical components size, complexity, and cost. Producing a high quality convergent beam 12 with a very wide angle of coverage is not trivial. Further, the detection system which is typically a two-dimensional detector array (e.g. CCD or CMOS camera) is produced in certain sizes (e.g. ½" CCD is 4 mm×6 mm) and a wide angle reflected beam once re-collimated would overfill the relatively small detector area. This can be compensated with compression optics by demagnifying the image to fit the detector 22, however resolution would suffer since movement of the SPR signal image would be covering fewer pixels.

To get around this, research based SPR systems with a reasonable cone angle (~NA=0.2) could actually rotate the SPR prism about the focused position on the front of the sensor surface and simultaneously rotate the detector (at 2× rate due to reflection) to capture the reflected image. This allows capture from virtually most SPR($\theta$)'s and certainly air and liquid.

A small handheld portable system however cannot afford the luxury of any moving parts. There are several configurations disclosed here of an optical and detection system that can facilitate a large angular spread of the incident and reflected beams in a SPR system that allow for a large dynamic range (large range of SPR($\theta$)'s) of the instrument. Other configurations described herein allow for a conventional dynamic range with the added benefit of capturing a signal well outside the dynamic range (i.e. air signal outside of dynamic range of liquids with indices of refraction near that of water). The effective angular spread of the incident beam(s) is enough to capture an air reference signal (with refractive index R2=1.0) and a liquid test sample signal (with refractive index R3).

As shown in FIG. 3, an SPR signal appears as a dark line in an otherwise bright field on the detector plane. Dark lines represent the absorption of light into the metallic thin-film and the bright field is reflection of other angles of the light from the underside of the metallic thin-film. As depicted in FIGS. 4A and 4B, capturing a SPR signal from pure water (R3=1.33) requires an angle of incidence (with respect to the surface normal) of about 55 degrees; from air, about 33 degrees (FIGS. 5A and 5B). This means that the angular range of the incident beam needs to be at least about 20 degrees, or alternatively at least about 22 degrees or at least about 28 degrees. This implies a numerical aperture of 0.24. Since the handheld device is small, the diameter of the laser beam is ~2 mm, and as such the focusing lens to produce the convergent beam would be at least this diameter. From simple geometry, the focal of this lens using an NA of 0.24 would be f=4 mm and an f/#=2. This is a relatively fast optical system if simple (single element) lenses are to be used, and as such the performance would suffer in the final image quality. Multi-element lenses would be needed to correct for aberrations.

Figure 6A:
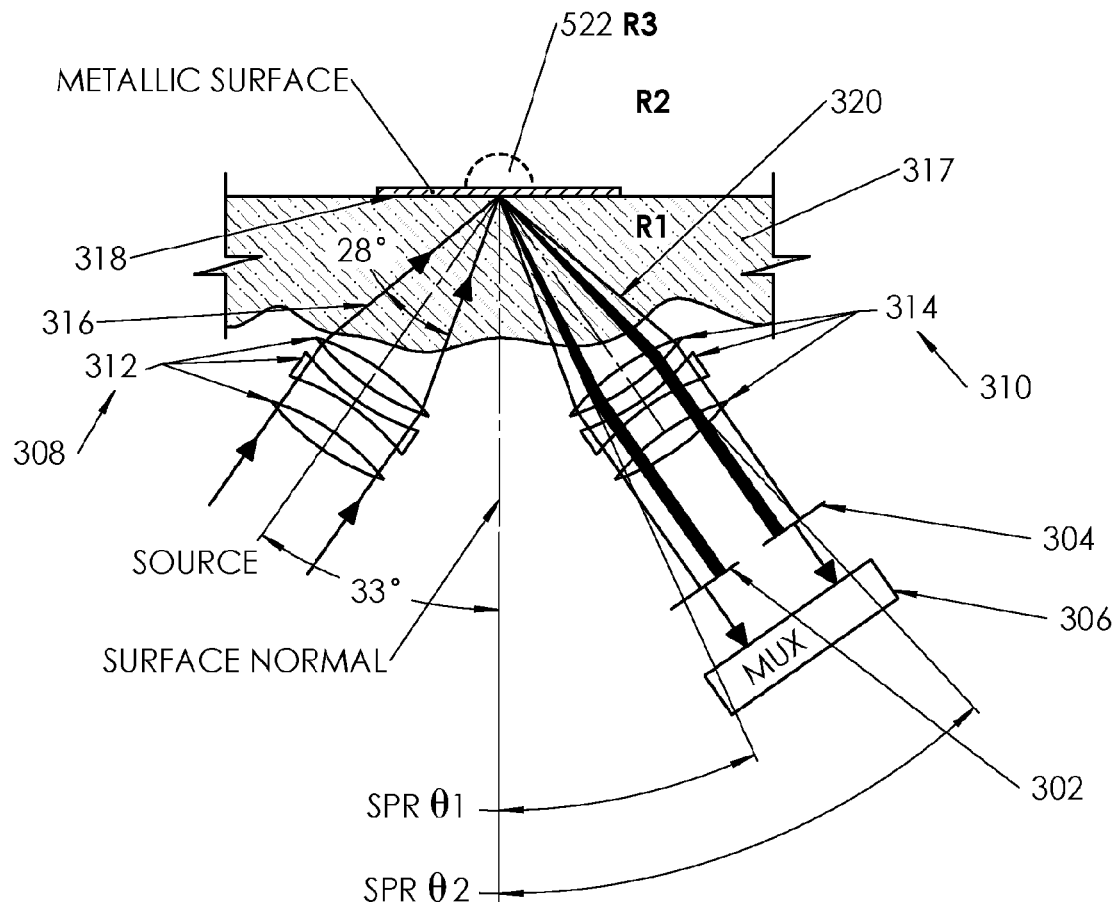
FIG. 6A is a diagram of an optical system for deriving SPR signals for both air and a liquid such as water.
Figure 6B:
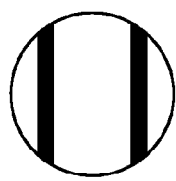
FIG. 6B shows relative locations of two SPR absorption lines in an image produced by the system of FIG. 4A.

FIGS. 6A and 6B illustrate a system 300 with double detectors 302 and 304 feeding output signals to a multiplexer 306 (MUX). The system 300 includes, for an f/2 optical system, i.e. one with a large enough convergence angle that would cover both the SPR signal for air (R2=1.0) and the SPR signal for a solution (R3 replaces R2), well corrected input and output optics 308 and 310. Cylindrical lenses 312 and 314 are typically used since a SPR optical system generates a convergent or input beam 316 into optical substrate 317 delivering a focused line to the underside of metallic thin-film 318, and as such input and output optics 308 and 310 include multi-element (doublets or triplets) lenses or even acylindrical (aspherical cylindrical equivalent) lenses 312, 314. With input beam 316 casting a sufficiently large convergent angle onto the sensor surface 318, reflection will be equal and opposite to produce a symmetrically shaped divergent output beam 320 and collimation of this beam by output optics 310 produces a relatively large diameter, larger than a typical detector dimension (CCD or CMOS sensor). Although compression of the reflected beam could be accomplished with additional lenses (inverse beam expander) resolution would be reduced. The capture of SPR signals is accomplished by the 2 two-dimensional image sensors or detectors 302 and 304, one for the reference SPR signal from air (R2=1.0) and one for the SPR signal from the solution under test (R3) 522. The two image signals are combined via multiplexer 306 and provided to the signal processor (124, FIGS. 2A and B).

Figure 7A:
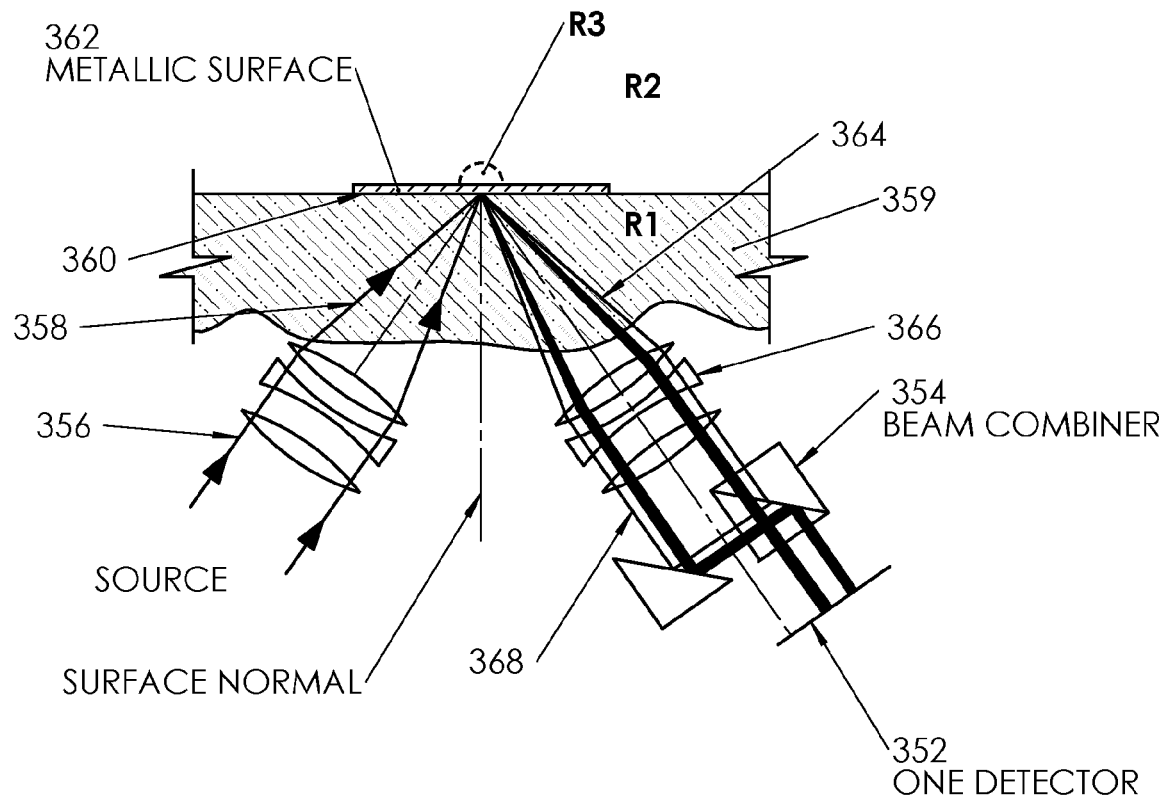
FIG. 7A is a diagram of another optical system for deriving SPR signals for both air and a liquid such as water.
Figure 7B:
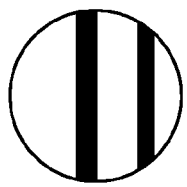
FIG. 7B shows relative locations of two SPR absorption lines in an image produced by the system of FIG. 4A.

FIGS. 7A and 7B illustrate a system 350 with a single image detector 352 and with an optical beam combiner 354. Multi-element input optics 356 directs a convergent input beam 358 through optical substrate with refractive index R1 onto underside 360 of a metallic thin-film 362, while a divergent output beam 364 is collimated by multi-element output optics 366 to form a wide parallel beam 368 carrying SPR signal for a reference with refractive index R2 (e.g., air) and at an instant of time immediately thereafter, a test fluid with refractive index R3 (e.g. an aqueous solution). Beam 368 is combined optically through the use of optical beam combiner cube (beam splitter) 354.

Figure 8:
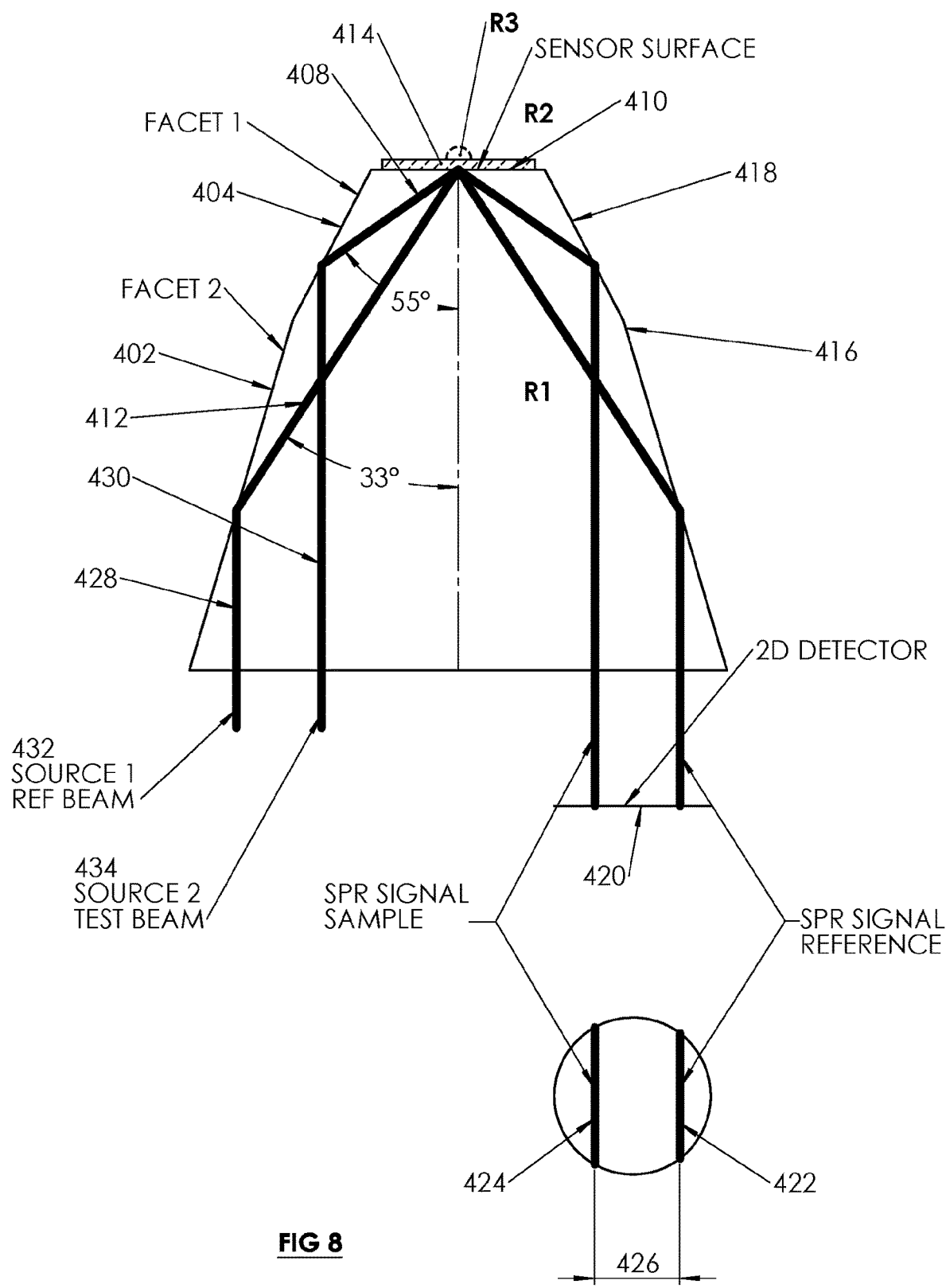
FIG. 8 is a diagram, on a greatly enlarged scale of a sensor prism 406, showing SPR signal lines (inset) and associated beam paths for deriving SPR signals for both air and a liquid such as water.

In an alternative approach depicted in FIG. 8, internally reflecting facets or surfaces 402 and 404 on an input side of a sensor prism 406 which is an optical substrate with refractive index R1 deliver a convergent or input beam 408 to the underside of a metallic thin-film 410 and are compound or relatively angled. The opposite or the top side of the metallic thin-film is in contact with refractive index R2. The double faceted input side can deliver a first portion 412 of the input beam 408 at a nominal 33 degree incidence angle and a second portion 414 of the input beam 408 at a nominal 55 degree incidence angle. The output facets 416 and 418 of sensor prism 406 are mirror images of the input facets 402 and 404 and deliver to a detector array 420 two distinct SPR signals 422 and 424 generated by samples with refractive indices of R2 and R3 separated by a discernable distance 426. The input beam 408 may be generated from double source beams 428 and 430. In that case, one light source 432 delivers light beam 428 to prism facet or surface 402 of the SPR prism to produce beam portion 412 with an angle of incidence to the normal of the metallic thin-film 410 of 33 degrees. Another light source 434 (optionally a single source split into two) displaced horizontally from the first source 432 delivers light beam 430 to prism facet or surface 404 such that the angle of incidence of beam portion 414 to the metallic thin-film normal is 55 degrees. In an alternative approach, input beam 408 is a single beam wide enough to cover both facets 402 and 404 in one shot. It is in these ways that two SPR signals, one reference and one measurement would be delivered simultaneously to the detector array 420 and processed such that the resultant measurement would involve and the difference in pixel spacing between the two and when compared to a calibration table unknown sample concentration can be measured with precision.

Rather than using the SPR signal from air, a separate calibration solution could be kept in a vial within the head of the instrument that would be released just prior to measurement. This sort approach is more adept to the microfluidic dip system described below with reference to FIG. 11.

Figure 9A:
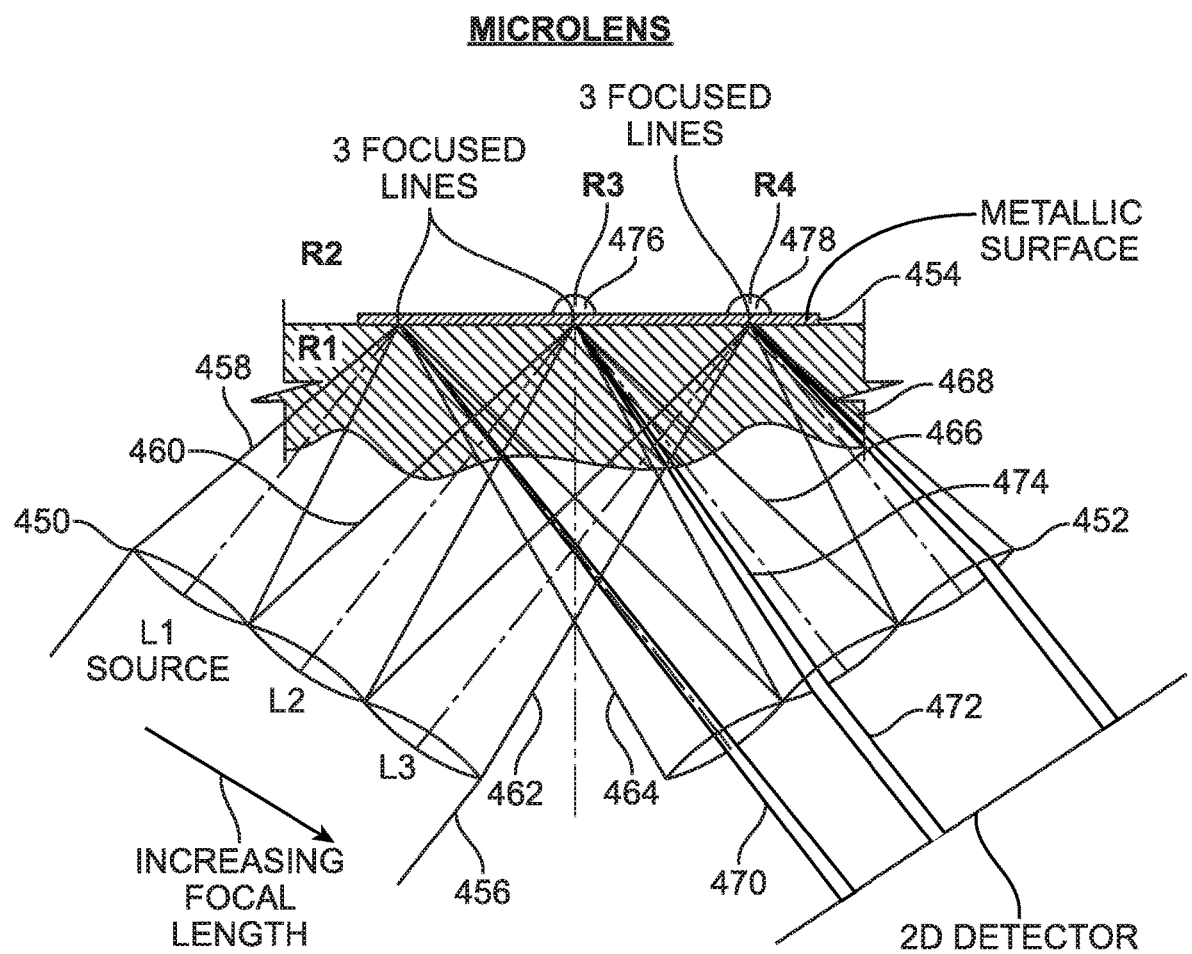
FIG. 9A is a diagram of yet another optical system for deriving SPR signals for both air and a liquid such as water.
Figure 9B:
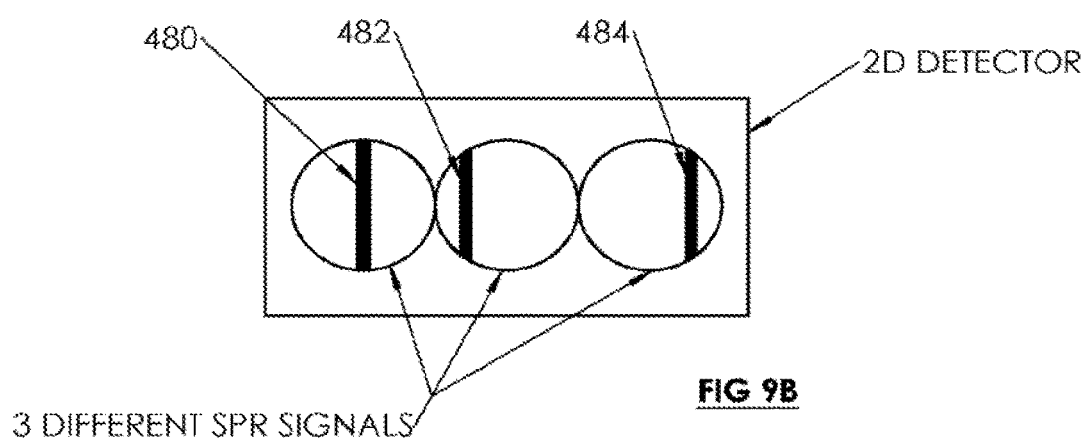
FIG. 9B shows three image fields each depicting relative locations of two SPR absorption lines in an image produced by the system of FIG. 9A.

In yet another embodiment, shown in FIGS. 9A and 9B, a technique for self-referencing includes input and output lenticular microlens arrays 450 and 452 for delivering and capturing light from a metallic thin-film surface 454. A collimated beam of light 456 is input into lenticular (cylindrical) lens array 450. This produces converging beams 458, 460, 462 generating multiple focused line images on the underside of metallic thin film surface 454 each one available to generate its own SPR signal. Upon reflection, respective divergent beams 464, 466, 468 are sent to lenticular array 452 which collimates each beam respectively at 470, 472, 474, sending a multiple SPR signals to a detector 476. If the SPR system is set up in the conventional Kretschmann configuration, the design of the lenticular array 450 requires that each lens element 450 have an increasing focal length to accommodate the tilted surface. With appropriate sectioning, one beam 458, 460, or 462 could be used for reference sample (shown as air with refractive index R2) and the others for test samples 476 with and 478 with refractive indices R3 and R4 generating SPR reference signal 480 and test sample signals 482 and 484 in FIG. 9B. In fact, depending on the number of lens elements 450 and 452, multiple readings of different solutions are obtainable along with a reference signal. This could be done an appropriate modification of the design of a microfluidic system described below, and to obtain specificity for each channel (SPR signal), a separate ligand is applied to different portions of the metallic thin-film surface 454. This allows for detection of multiple analytes in a single measurement process (FIG. 9B) all done at the same instant in time. Capturing all SPR signals at exactly the same time could prove to be an important aspect of an accurate measurement system. Since SPR is an extremely sensitive technique, if the reference or sample changes over time as a result of external forces (e.g. active contamination is occurring because of local environment), then simultaneous signal capture would remove time related variables producing a more accurate measurement upon comparison of the signals to the reference or each other.

Though moving parts have been deemed to impractical, a scanner to cover the range needed could employ a digital micromirror device (DMD). These are small semiconductor devices that have a rectangular array of microsized mirrors that can rotate individually. In this case the laser would impinge on the DMD and the electronics would control the micromirrors to scan the beam across the range of angles to SPR signals from the reference and the sample.

Another means of self-referencing may be the use of multiple wavelengths in the SPR source beam. The SPR angle where the absorption occurs is dependent on wavelength. For example is both a red and green laser are used in overlapping incident beams by use of a beam combiner cube, the SPR(θ) for red would be different than green and result in two dark lines in the image such as shown in FIG. 7B. The separation between these two signals would be used as reference. However, unlike the signal from air or other calibration solution relative to the solution under test where the separation between the two dark lines is large, signals from different wavelengths are nearly on top of each other. The distance is dependent on wavelength (any wavelength can be used in SPR from ultraviolet to visible to infrared) but in practice it may be difficult to discern the two signals from each other. Nevertheless, running two wavelengths through the system may provide useful (or overlapping) calibration information with a marginal increase in device cost.

Dip Probe

For a handheld SPR system to be conveniently used in the field for testing harvested liquids, it is preferable to be able to dip the handheld tip into liquid. The SPR probe described by Cappo et al in U.S. Pat. No. 7,395,103, is a contact-type probe, i.e. the sensor surface is meant to momentarily contact a wet surface and measurement is made upon contact. A contact probe presents difficulty when the sample is a beaker full of liquid for instance. SPR sensor surfaces are typically planar and bordering them are some sort of reflecting facets to direct the incoming light to the proper angle for SPR to occur. The '103 patent describes a sensor surface with two sloping surfaces that are used under total internal reflection as mirror surfaces to deliver light to the sensor and reflect it to the detector. If one were to dip this sensing surface into sample beaker only contact of the liquid and the sensor surface should occur; if liquid contacts the facets it would break up the total internal reflection and the light would no longer be reflected to the sensing surface or detector. Even if these sloped surfaces were coated with a reflective thin-film (e.g. aluminized), because of the small size and close fit of the components liquid touched to the facets or side of the sensor prism could wick up into the device through capillary action causing catastrophic damage to the instrument.

Conventional and commercial SPR instruments typically use a 'flow cell' to deliver liquid to the sensor surface consisting of pump system to draw fluid from a beaker through tubing into a port leading to a small cell or chamber with one open end in direct contact with the sensing surface. The liquid is pushed or flowed through the chamber from the action of the pump out an exit port into tubing and generally into a waste container. Using this system, the experimenter can subsequently flow several liquids across the surface and record dynamic changes in the SPR signal which can be related back to such things as molecular binding and disassociation. The different liquids can be changed through a manifold system or by simply placing the tubing is different beakers while the pump is running. This has an added convenience in say a chemistry laboratory and the instrument becomes a black box and only the chemistry entering the tubing is of interest.

For a handled SPR system to be used as a dip probe, one way to achieve this would be to connect the handheld to a flow cell system with tubing and chamber. The tube may be inserted into the beaker and some sort of pump system ma be incorporated. However, in the field it is desired to minimize components, electrical power needs, and time to configure an experiment. An all-in-one system is highly desirable—one monolithic device that draws in fluid, delivers the sample to the sensing surface, and makes the measurement, all in a miniaturized size.

Figure 10:
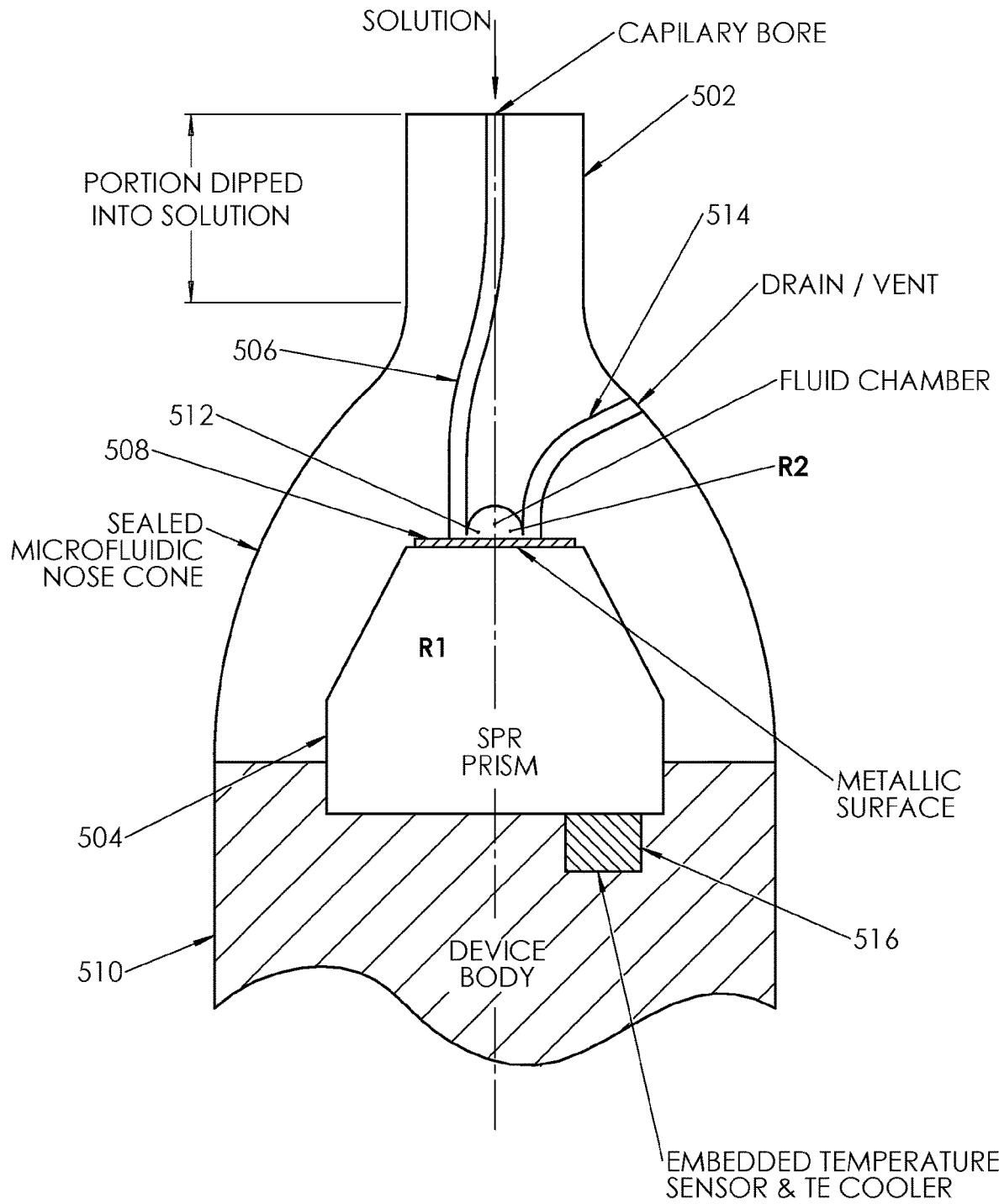
FIG. 10 is a schematic cross-sectional view of an SPR device with a microfluidic cap.

An alternative is illustrated in FIG. 10 which shows a 'nose-cone' or cap member 502 slipped over a sensor prism 504 with refractive index R1. Cap member 502 contains at least one microfluidic pathway 506 configured for delivering liquid to the top side of a thin-film metallic surface 508 with refractive index R2. Cap 502 may be a plastic part fabricated by conventional means with small capillary bores and could be a disposable member discarded after measurement. Cap member 502 may be configured to encapsulate the entire handheld SPR system (not shown) or a good portion thereof as depicted in FIG. 10 in a liquid-tight fit at least over the sensor prism 504 so that no liquid can penetrate a housing 510 of the instrument. The microfluidic pathway 506 is a capillary bore delivering test solution (with refractive index R2) to a small chamber 512 located at or over the focused line on the thin-film metallic surface 508. The length of the capillary bore may be dictated by the surface forces in action in the system to be detected. The length of the tube may be modulated by altering surface properties of the inner wall of the capillary by, for example, coating with surface active agents like polymers and surfactants, and/or external stimulation including but not limited to electrical voltage, electromagnetic radiation (e.g., light) and acoustic waves, so that the tube is long enough for sample collection and short enough so that the sample reaches the sensor surface. As a result, equipment may be designed to cater to any special situation that might arise. In a particular embodiment, a cap may be devised with longer capillary length by coating the inner wall with a material that would increase the contact angle with the sample to be collected and make sample collection from hard to reach areas easier. One would of course have to choose coating materials that would not interfere with the detection of the analyte. Cap member 502 further includes a microfluidic pathway 514 to vent air and drain the solution.

Since SPR is temperature dependent, a temperature sensor and a thermoelectric cooler 516 (and 122 in FIG. 2) is embedded below the SPR prism 504 to feed temperature data to a signal processor (e.g. 124 in FIG. 2) in real time and compensate the final result.

Figure 11:
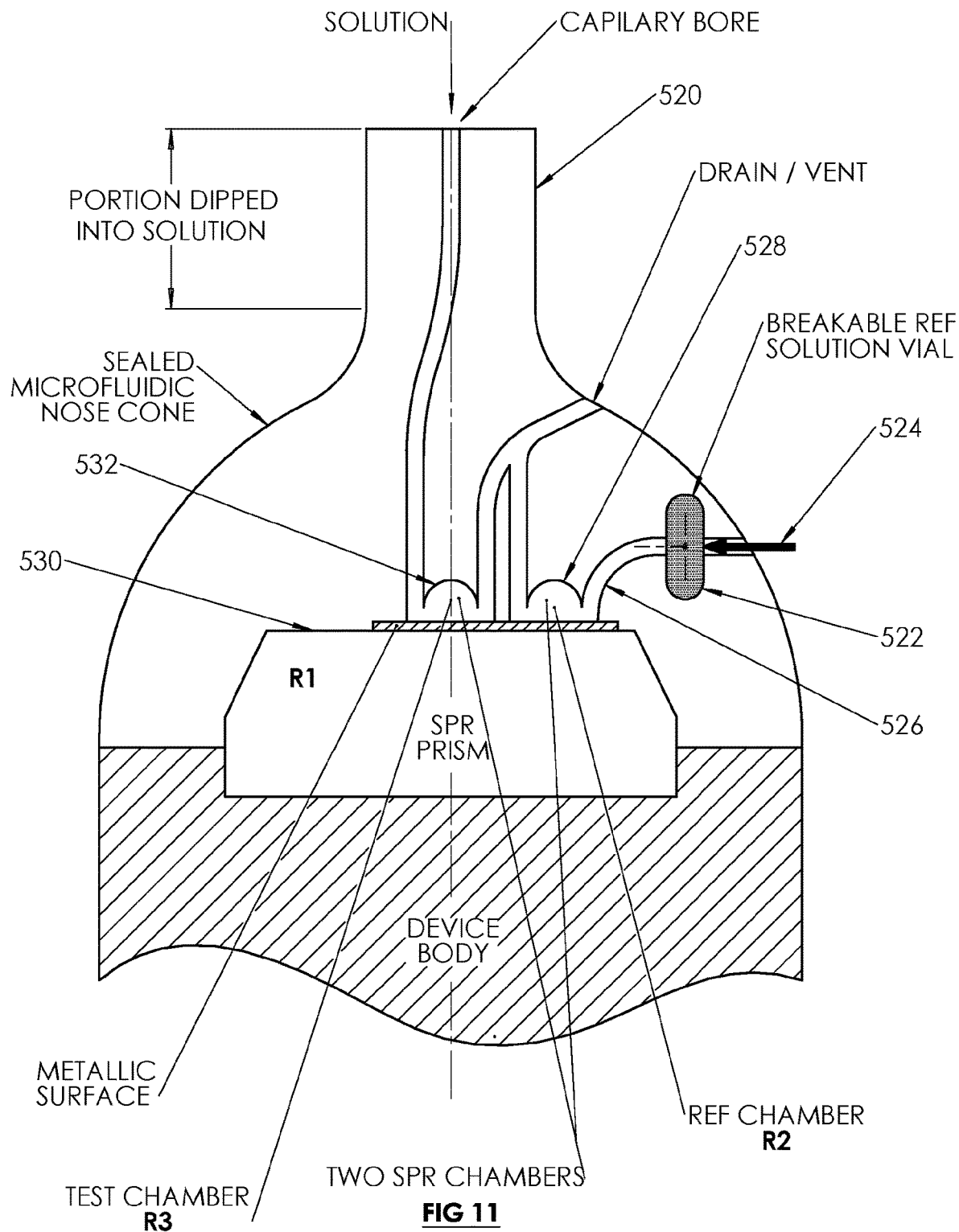
FIG. 11 is a schematic cross-sectional view of an SPR device with another microfluidic cap in accordance with the present invention.

A reference signal may be obtained by introducing a reference solution onto the metallic thin-film surface using a two channel SPR system whereby two sites on the metallic thin-film surface are interrogated. For instance, in the lenticular lens system described above, one channel (focused line) would have its own microfluidic pathway for the test solution with refractive index R3, and another channel with a separate microfluidic pathway for a reference solution with refractive index R2. As depicted in FIG. 11, the reference solution with refractive index R2 may reside inside a nose-cone-type cap member 520 in a small breakable vial 522 and is released by pushing a plunger 524 to break the vial. The solution travels down a capillary bore 526 to a chamber 528 adjacent to the metallic thin-film surface 530 and isolated from a test solution (refractive index R3) chamber 532.

In a particular embodiment, to sample a body of water in a remote location, a sample is scooped into a test beaker, filtered for large particulates, and the SPR handheld inserted into the beaker. Solution is drawn into the small bore by capillary action and delivered to the sensor. The microfluidic system is designed in such a way to include venting, self-closing valves so one could dip from one liquid to another without introducing air bubbles.

Integrating Other Analytical Techniques

As stated earlier, chemistry laboratories often have a host of complementary equipment that can produce the same results using a different technique. At times the results overlap or one instrument can provide information that other instrument lacks. When using any analytical instrument, it is useful to have access to other instruments employing different technology to insure confidence in the result. There are many different instruments that can measure very small concentrations. However, at times it is necessary to confirm a measurement with another instrument or confirm part of the process of an instrument has occurred as intended.

For instance, in SPR systems where the sensor surface is prepared with a ligand, be it a protein or other chemical composition, whether or not the ligand is bound to the surface cannot be certain. Without the ligand bound to the sensor surface the measurement is fruitless. As an example, boronic acid (the ligand) is typically bound to an SPR sensor surface through thiol chemistry for use as a sugar sensor. The process of binding the ligand requires the application of several chemicals to the sensor surface over a period of time and building a self-assembled monolayer, the last layer being the boronic acid. Other than testing the ligand with the analyte of interest and getting either good or confounding results, there is no way to know that the boronic acid has actually adhered to the sensor. One method to check for bound boronic acid to the sensor surface is to analyze the prepared surface in another analytical instrument e.g. x-ray photoelectron spectroscopy (XPS) that can measure the elemental composition of the surface. If the ligand is bound to the SPR sensor surface the instrument will show a spectra with a high concentration of boron in this case. Having this information that the ligand is indeed bound to the sensor surface rules out any concern of the sensor being the source of unexpected results, and saves experimental time which would be wasted on testing with a sensor that is improperly prepared.

Integration of other analytical chemistry techniques would be a great advantage to a field portable system providing additional or overlapping data to aid in confidence of a measurement. In a particular embodiment, fluorescence spectroscopy is a common technique that has some similarities to SPR in that the ligand/analyte chemistry can be used. In fact, the same ligand can be used, however in fluorescence spectroscopy the ligand is dissolved in solution and interacts with the analyte. When illuminated with light of a particular wavelength (e.g. Ultraviolet) the solution fluoresces emitting other wavelengths usually in a broad spectrum. By filtering the spectrum and looking at the intensities of for example, blue and green light, typically the ratio of the relative intensities is taken and from this one can infer the concentration of the analyte. The difference between fluorescence spectroscopy and SPR spectroscopy is that fluorescence is done in solution whereas SPR is done on a surface, with SPR being inherently more sensitive.

The fact the SPR and fluorescence spectroscopy have in common the ligand/analyte chemistry technique, leads to a combination instrument with both SPR and fluorescence. In SPR the sensor surface is illuminated from the back side (the light passes through glass substrate to the metallic surface and reflects), whereas in fluorescence the sensor is illuminated from the front side (the light strikes and reflects from the metallic surface and does not penetrate the substrate). In a handheld device then with a with cap 502 described in FIG. 10, this part could be extended to house the elements of a fluorescence spectroscope, namely a small UV source (e.g. light emitting diode, (LED)), bandpass filters for separating the fluorescence spectrum generated, and electronic detectors for measuring the relative intensities of the wavelengths of interest. Given the state-of-the-art in LED sources which can be obtained at little more 1 mm square (e.g. Phillips Lumileds Luxeon p/n LHUV-0385), and with an integrating two-dimensional array detector (e.g. Omnivision p/n OV07191-A20A, 640×480 CMOS image sensor) at about the same size, it is possible to build into cap 502 an entire fluorescence spectrometer to be used in conjunction with the SPR system which includes the ligand attached to the sensor. The reflected light from the fluorescence signal could also be sent via a system of mirrors to the two-dimensional array used in the SPR system for economy. In this case two distinct measurements are occurring on the same sample 1) the ligand is interacting with the analyte in the solution that sits on top of the metallic surface and the solution fluoresces when irradiated with UV light and 2) the ligand and analyte are interacting on the metallic surface causing change in SPR resonance angle.

This dual use system becomes very powerful in that measurements can be made with two different techniques at nearly exactly the same time. Obvious benefits include single sample preparation, sensors preparation, and more comparable results since any variables that would otherwise lead to inconsistent measurements (e.g. temperature) will be taken into account at the exact same time. Other benefits not immediately obvious may also result.

Other analytic instruments could be integrated into the handheld SPR device and not be limited to fluorescence. For example, other spectroscopy techniques where a broadband optical source is delivered to the surface and the reflected light is measured as a function of wavelength; certain wavelengths are absorbed by the surface sample which are indicative of the composition. The source of radiation can be ultraviolet, visible, or infrared, in which case the technique would be known as UV-VIS spectroscopy or IR spectroscopy. In a modification of the UV-VIS or IR spectroscopy configuration, one could also perform Reflectance Spectroscopy where the light scattered from the surface by the particle size. In another embodiment, one could perform electrochemistry in addition to SPR. Electrochemistry includes Impedance Spectroscopy and Cyclic Voltammetry. Electrochemistry also requires a thin-film of metal and would be performed from the 'front side' of the sensor surface whereas SPR would interrogate the sample from the 'back side' allowing for simultaneous measurements of both SPR and Impedance Spectroscopy for instance.

Figure 12:
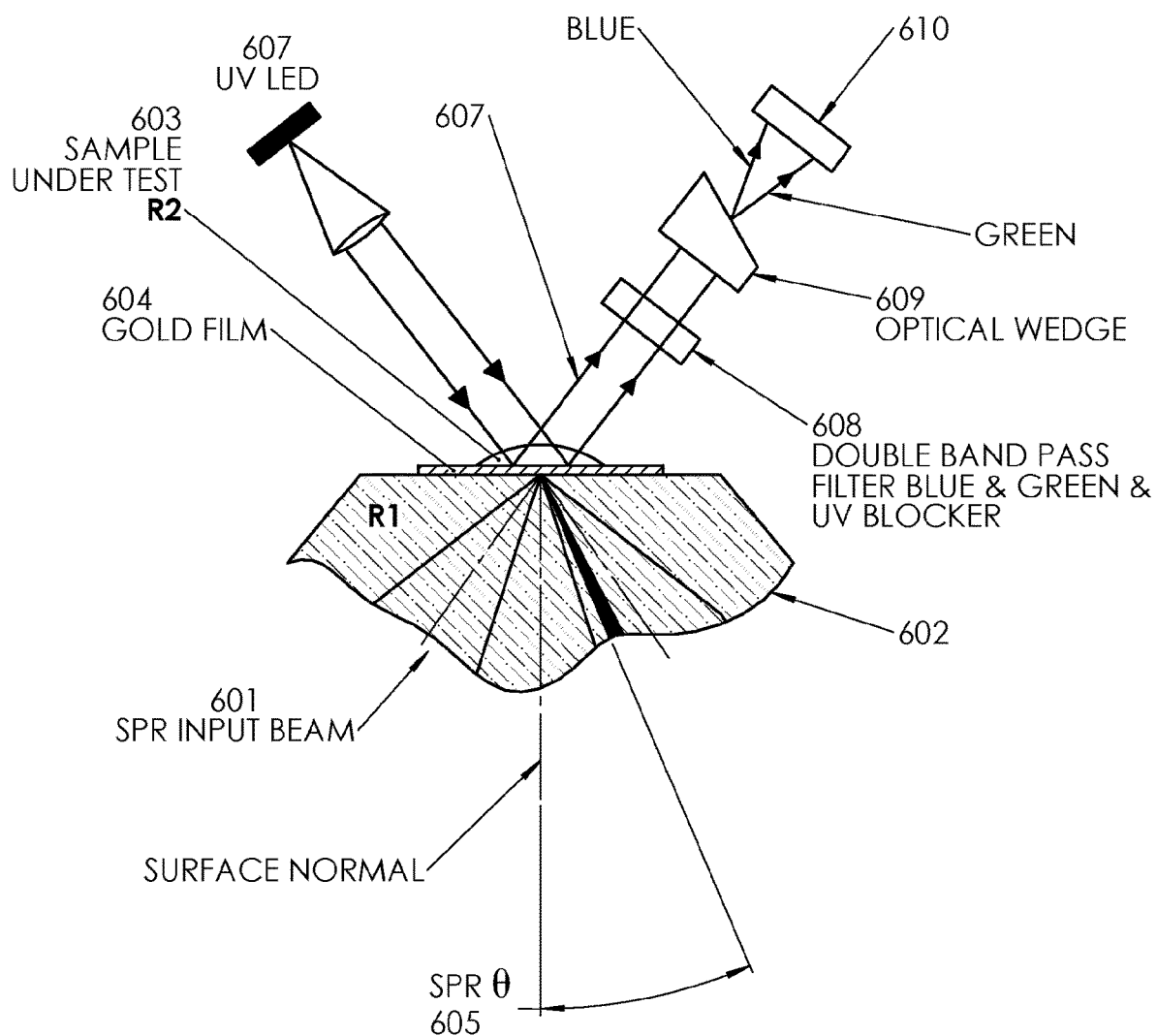
FIG. 12 is a schematic of a combination device.

FIG. 12 depicts the miniature components in a combination device using one sensor surface with a ligand analyte pair residing on top of the gold film. SPR measurement are performed as previously described where the convergent input beam 601 travels through an optical substrate 602 with a refractive index R1 and is focused to a line image at the location of the sample under test 603 containing the ligand analyte pair. Light is reflected from the gold film 604 and resonance angle SPR(θ) 605 is produced. The fluorescence spectrometer portion is comprised of a UV LED 606 emitting a narrow band of ultraviolet light which is directed towards sample 603 with a refractive index R2 but from the opposite side of the gold film as the SPR measurement. The UV beam interact with the sample containing the ligand/analyte pair. The reflected beam carries the UV excitation and a broadband fluorescence spectrum 607. This beam is passed through a double bandpass filter which transmits narrow band blue and narrow band green light while blocking the UV excitation beam 608. An optical wedge 609 disperses the green and blue light at different angles which each strike on respective halves of CMOS detector 610. Intensity values from each side of the CMOS detector are recorded and ratiometric calculations derive concentration.

Figure 13:
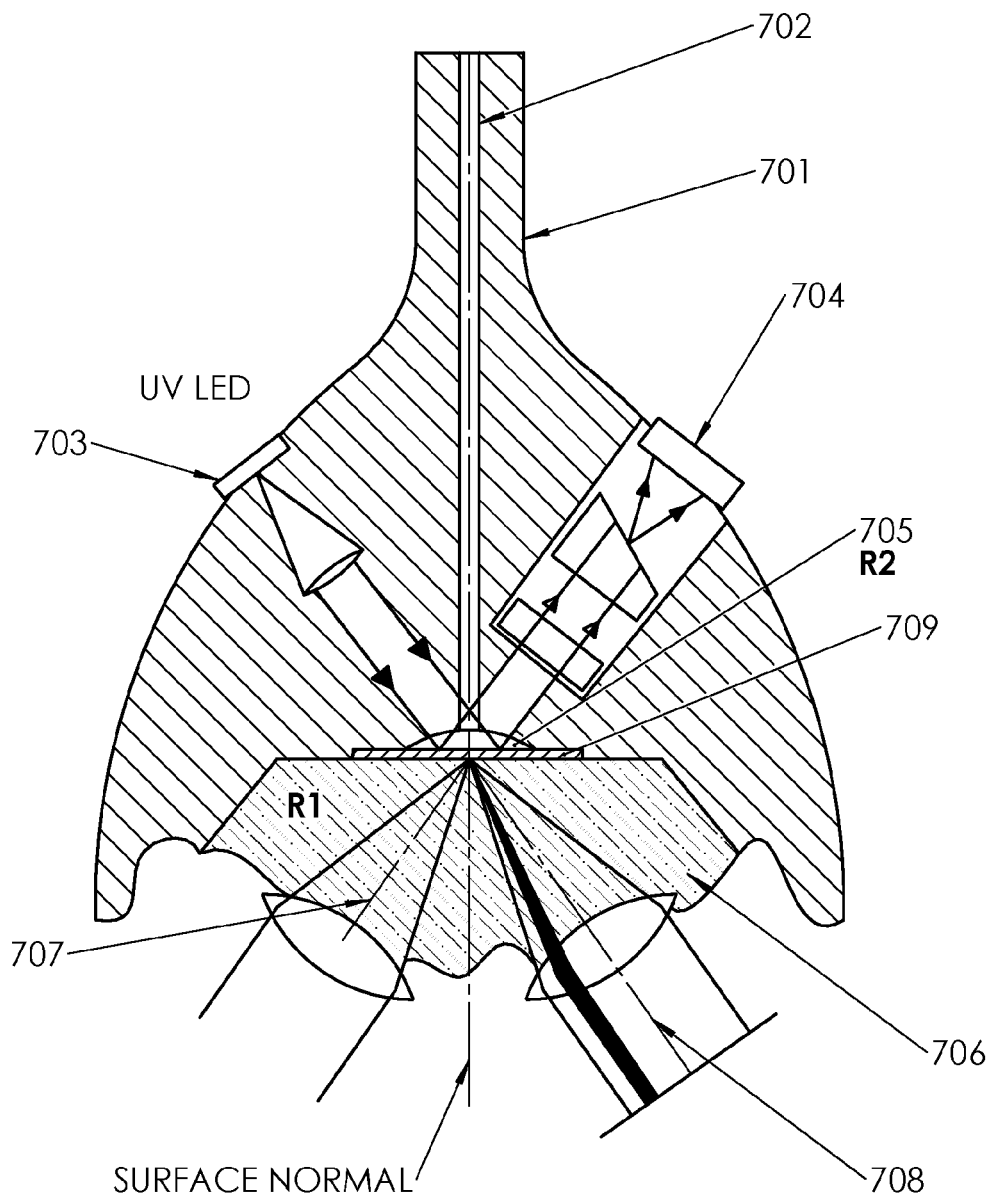
FIG. 13 is a schematic of a cap incorporating SPR and fluorescence detection systems.

Both systems shown FIG. 13 are incorporated into a cap similar to 502 (see FIG. 10), 701 with capillary bore 702 and a sample containing ligand/analyte pair 705. The fluorescence system is shown with UV LED 703 with a detection arm 704 containing a double bandpass filter, optical wedge and CMOS detector. The SPR portion is shown with input beam 707 reflecting from gold film 709 on optical substrate 706 with a refractive index R1 generating SPR signal beam 708. Faceted SPR prism is shown 708.

What is claimed is:
1. A detection method comprising:
attaching a replaceable modular sensor comprising a first planar metallic layer to a surface plasmon resonance (SPR) device, wherein the SPR device comprises:
a housing;
an input optical system comprising a first input reflecting facet and a second input reflecting facet;
an output optical system comprising a first output reflecting facet and a second output reflecting facet, and imaging optics to direct a reflected light beam to an opto-electronic sensor; and a signal processing unit configured to receive an image signal from the output optical system and to deliver two distinct SPR signals to a field of view of a detector array, wherein each of said two distinct SPR signals corresponds to an SPR angle minimum for an incident light beam;

contacting the first planar metallic layer with a reference fluid;

operating the SPR device to determine an SPR angle minimum for the reference fluid using the first input reflecting facet and the first output reflecting facet;

contacting the first planar metallic layer with a test fluid;

operating the SPR device to determine an SPR angle minimum for the test fluid using the second input reflecting facet and the second output reflecting facet;

simultaneously displaying the SPR angle minimum for the reference fluid and the SPR angle minimum for the test fluid in the field of view of the detector array; and measuring a discernable difference between the SPR angle minimum for the reference fluid and the SPR angle minimum for the test fluid in the field of view of the detector array.

2. The method according to claim 1, further comprising:
removing the replaceable modular sensor from the SPR device; and
attaching a different replaceable modular sensor to the SPR device.

3. The method according to claim 1, wherein the analyte is a solute particle.

4. The method according to claim 3, further comprising determining an osmolarity of the test fluid.

5. The method according to claim 1, wherein the reference fluid is air.

6. The method according to claim 1, further comprising comparing the discernable difference between the SPR angle minimum for the reference fluid and the SPR angle minimum for the test fluid in the field of view of the detector array to a calibration data set.

7. The method according to claim 1, wherein operating the SPR device comprises scanning an incident light beam across an angular range that covers the SPR angle minimum for the reference fluid and the SPR angle minimum for the test fluid.

8. The method according to claim 7, wherein the angular range spans 28 degrees.

9. The method according to claim 7, wherein the incident light beam comprises light of two or more different wavelengths.

10. A method for operating a device for detecting a presence of a fluid constituent, wherein the device comprises a housing and first optical elements disposed in the housing, comprising a source of electromagnetic radiation, the device further comprising second optical elements disposed in the housing and comprising at least one opto-electrical transducer, the device also comprising a signal processor disposed in the housing and operatively connected to the at least one opto-electrical transducer, the method comprising:

attaching a sensor to the housing, wherein the sensor comprises a planar metallic layer, a first and a second input reflecting facet, and a first and a second output reflecting facet;

disposing a reference fluid in contact with the planar metallic layer;

operating the first optical elements to direct at least one incident beam toward a rear side of the planar metallic layer at a predetermined range of angles to a normal to the planar metallic layer using the first input reflecting facet;

operating the second optical elements comprising the at least one opto-electrical transducer to detect a reflection intensity as a function of a reflection angle for the reference fluid using the first output reflecting facet;

generating a first electrical signal encoding the reflection intensity for the reference fluid;

operating the signal processor to detect from the first electrical signal an SPR angle minimum for the reference fluid;

disposing a test fluid in contact with the planar metallic layer;

operating the first optical elements to direct at least one incident beam toward a rear side of the planar metallic layer at the predetermined range of angles using the second input reflecting facet;

operating the second optical elements including the at least one opto-electrical transducer to detect a reflection intensity as a function of a reflection angle for the test fluid using the second output reflecting facet;

generating a second electrical signal encoding the reflection intensity for the test fluid;

operating the signal processor to detect from the second electrical signal an SPR angle minimum for the test fluid;

simultaneously displaying the SPR angle minimum for the reference fluid and the SPR angle minimum for the test fluid in a field of view of a detector array; and measuring a discernable difference between the SPR angle minimum for the reference fluid and the SPR angle minimum for the test fluid in the field of view of the detector array.

11. The method according to claim 10, wherein the analyte is a solute particle.

12. The method according to claim 11, further comprising determining an osmolarity of the test fluid.

13. The method according to claim 10, wherein the reference fluid is air.

14. The method according to claim 10, further comprising comparing the discernable difference between the SPR angle minimum for the reference fluid and the SPR angle minimum for the test fluid on the field of view of the detector array to a calibration data set.

15. The method according to claim 10, wherein the predetermined range of angles covers the SPR angle minimum for the reference fluid and the SPR angle minimum for the test fluid.

16. The method according to claim 15, wherein the predetermined range of angles spans 28 degrees.

17. The method according to claim 15, wherein the incident beam comprises light of two or more different wavelengths.

* * * * *